(12) United States Patent
Hirschmann et al.

(10) Patent No.: US 8,486,298 B2
(45) Date of Patent: Jul. 16, 2013

(54) LIQUID-CRYSTALLINE MEDIUM

(75) Inventors: Harald Hirschmann, Darmstadt (DE); Christian Hock, Mainaschaff (DE); Martina Weidner, Muenster (DE); Volker Reiffenrath, Rossdorf (DE)

(73) Assignee: Merck Patent GmbH, Darmstadt (DE)

( * ) Notice: Subject to any disclaimer, the term of this patent is extended or adjusted under 35 U.S.C. 154(b) by 584 days.

(21) Appl. No.: 12/439,187

(22) PCT Filed: Aug. 29, 2007

(86) PCT No.: PCT/EP2007/007546
§ 371 (c)(1),
(2), (4) Date: Feb. 27, 2009

(87) PCT Pub. No.: WO2008/025533
PCT Pub. Date: Mar. 6, 2008

(65) Prior Publication Data
US 2010/0026953 A1  Feb. 4, 2010

(30) Foreign Application Priority Data
Sep. 1, 2006 (DE) .................. 10 2006 041 133

(51) Int. Cl.
C09K 19/00 (2006.01)
C09K 19/06 (2006.01)
C09K 19/34 (2006.01)
C09K 19/52 (2006.01)

(52) U.S. Cl.
USPC .............. 252/299.66; 252/299.01; 252/299.6; 252/299.63; 428/1.1; 349/182; 349/187

(58) Field of Classification Search
USPC . 252/299.01, 299.6, 299.63, 299.66; 428/1.1; 430/20; 349/182, 187
See application file for complete search history.

(56) References Cited

U.S. PATENT DOCUMENTS

| 5,061,400 | A | 10/1991 | Obikawa |
| 6,066,268 | A * | 5/2000 | Ichinose et al. .......... 252/299.63 |
| 6,740,369 | B2 * | 5/2004 | Klasen-Memmer et al. .. 428/1.1 |
| 6,858,267 | B2 * | 2/2005 | Manabe et al. ................. 428/1.1 |
| 7,807,236 | B2 * | 10/2010 | Hirschmann et al. .......... 428/1.1 |
| 2002/0038859 | A1 | 4/2002 | Heckmeier et al. |
| 2003/0098443 | A1 | 5/2003 | Manabe et al. |
| 2003/0190436 | A1 | 10/2003 | Manabe et al. |
| 2003/0197154 | A1 | 10/2003 | Manabe et al. |

FOREIGN PATENT DOCUMENTS

| DE | 39 21 836 A1 | 1/1990 |
| DE | 101 28 017 A1 | 3/2002 |
| DE | 101 51 491 A1 | 5/2002 |
| EP | 1 310 542 A1 | 5/2003 |
| GB | 2 378 707 A | 2/2003 |
| WO | WO 2005/123878 A1 | 12/2005 |

OTHER PUBLICATIONS

International Search Report of PCT/EP2007/007546 (Nov. 15, 2007).

* cited by examiner

*Primary Examiner* — Geraldina Visconti
(74) *Attorney, Agent, or Firm* — Millen, White, Zelano & Branigan, P.C.

(57) ABSTRACT

The invention relates to a liquid-crystalline medium comprising one or more compounds of the formula I

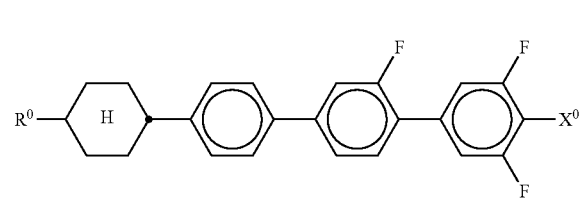

in which
$R^0$ and $X^0$ have the meanings indicated in Claim 1,
and to the use thereof in electro-optical liquid-crystal displays.

20 Claims, No Drawings

LIQUID-CRYSTALLINE MEDIUM

The present invention relates to a liquid-crystalline medium (LC medium), to the use thereof for electro-optical purposes, and to LC displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure. In addition, there are also cells which work with an electric field parallel to the substrate and liquid-crystal plane, such as, for example, IPS ("in-plane switching") cells. TN, STN, FFS (fringe field switching) and IPS cells, in particular, are currently commercially interesting areas of application for the media according to the invention.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies; TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diodoe Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

Besides liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation (d·$\Delta n$). This low optical retardation results in usually acceptably low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

For TV and video applications, displays having short response times are required. Such short response times can be achieved, in particular, if liquid-crystal media having low values for the viscosity, in particular the rotational viscosity $\gamma_1$, are used. However, diluting additives generally lower the clearing point and thus reduce the working-temperature range of the medium.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:

extended nematic phase range (in particular down to low temperatures)

switchability at extremely low temperatures (outdoor use, automobiles, avionics)

increased resistance to UV radiation (longer life)

low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In particular in the case of LC displays for TV and video applications (for example LCD TVs, monitors, PDAs, notebooks, games consoles), a significant reduction in the response times is desired. A reduction in the layer thickness d ("cellap") of the LC medium in the LC cell theoretically results in faster response times, but requires LC media having higher birefringence $\Delta n$ in order to ensure an adequate optical retardation ($d \cdot \Delta n$). However, the LC materials of high birefringence known from the prior art generally also have high rotational viscosity at the same time, which in turn has an adverse effect on the response times. There is therefore a demand for LC media which simultaneously have fast response times, low rotational viscosities and high birefringence.

The invention is based on the object of providing media, in particular for MLC, TN, STN, FFS or IPS displays of this type, which have the desired properties indicated above and do not exhibit the disadvantages mentioned above or only do so to a lesser extent. In particular, the LC media should have fast response times and low rotational viscosities at the same time as high birefringence. In addition, the LC media should have a high clearing point, high dielectric anisotropy and a low threshold voltage.

It has now been found that this object can be achieved if LC media comprising one or more compounds of the formula I are used. The compounds of the formula I result in mixtures having the desired properties indicated above.

The invention relates to a liquid-crystalline medium, characterised in that it comprises one or more compounds of the formula I

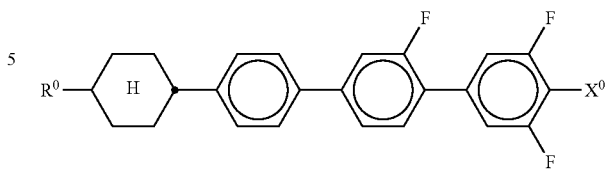

I in which $R^0$ denotes an alkyl or alkoxy radical having 1 to 15 C atoms, where one or more $CH_2$ groups in these radicals may also each, independently of one another, be replaced by —C≡C—, —$CF_2$O—, —CH=CH—,

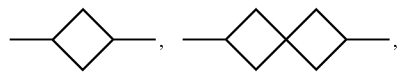

—O—, —CO—O— or —O—CO— in such a way that O atoms are not linked directly to one another, and in which, in addition, one or more H atoms may be replaced by halogen, $X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms.

Surprisingly, it has been found that LC media comprising compounds of the formula I simultaneously have low rotational viscosity $\gamma_1$ and high birefringence $\Delta n$, as well as fast response times, a low threshold voltage, a high clearing point, high positive dielectric anisotropy and a broad nematic phase range.

The compounds of the formula I have a broad range of applications. Depending on the choice of substituents, they can serve as base materials of which liquid-crystalline media are predominantly composed; however, liquid-crystalline base materials from other classes of compound can also be added to the compounds of the formula I in order, for example, to modify the dielectric and/or optical anisotropy of a dielectric of this type and/or to optimise its threshold voltage and/or its viscosity.

Preferred compounds of the formula I are mentioned below:

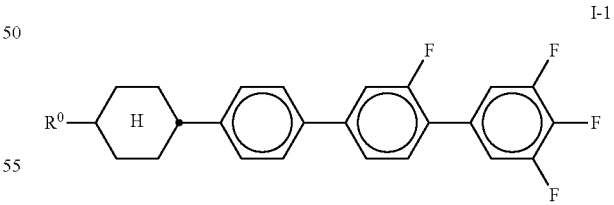

I-1

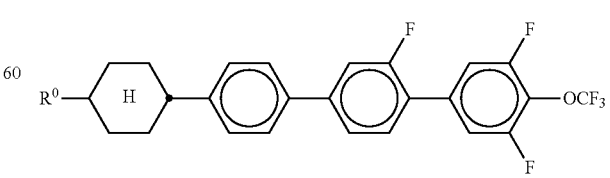

I-2 in which $R^0$ has the meanings indicated above and preferably denotes straight-chain alkyl. Particular preference is given to the compounds of the formulae I-1 and I-2, preferably in which $R^0$ denotes $C_2H_5$, n-$C_3H_7$ or n-$C_5H_{11}$.

In the pure state, the compounds of the formula I are colourless and form liquid-crystalline mesophases in a temperature range which is favourably located for electro-optical use. They are stable chemically, thermally and to light.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

If $R^0$ in the formulae above and below denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^0$ denotes an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl. These radicals may also be mono- or polysubstituted.

If $R^0$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, $X^0$ is preferably F, Cl or a mono- or polyfluorinated alkyl or alkoxy radical having 1, 2 or 3 C atoms or a mono- or polyfluorinated alkenyl radical having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CH_2F$, $OCFHCF_2CF_3$, $OCFHCF_2CHF_2$, $OCF_2CHFCF_3$, $OCF_2CF_2CF_3$, $OCF_2CF_2CClF_2$, $OCClFCF_2CF_3$, CF=$CF_2$, CF=CHF or CH=$CF_2$, very particularly preferably F or $OCF_3$.

Particular preference is given to compounds of the formula I in which $X^0$ denotes F or $OCF_3$. Further preferred compounds of the formula I are those in which $R^0$ denotes straight-chain alkyl or alkoxy having 1 to 8 C atoms or straight-chain alkenyl or alkenyloxy having 2 to 7 C atoms.

Further preferred embodiments are indicated below:

The medium additionally comprises one or more compounds of the formulae II and/or III

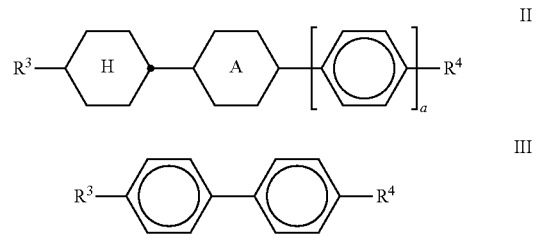

in which

A denotes 1,4-phenylene or trans-1,4-cyclohexylene, a is 0 or 1, and $R^3$ denotes alkenyl having 2 to 9 C atoms, and $R^4$ has the meaning indicated for $R^0$ in formula I and preferably denotes alkyl having 1 to 12 C atoms or alkenyl having 2 to 9 C atoms.

The compounds of the formula II are preferably selected from the following formulae:

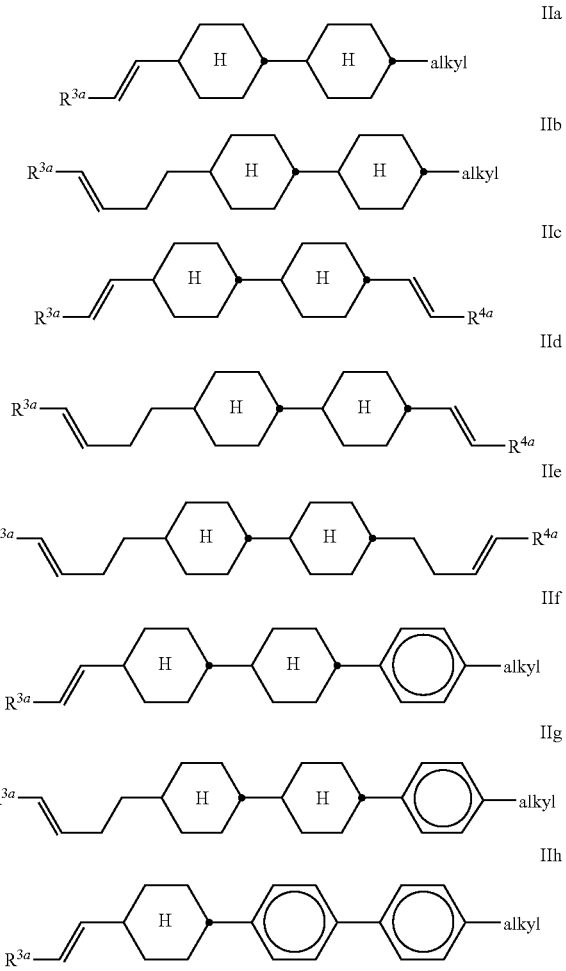

IIi

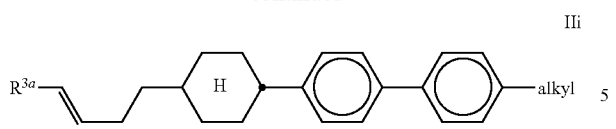

in which R$^{3a}$ and R$^{4a}$ each, independently of one another, denote H, CH$_3$, C$_2$H$_5$ or C$_3$H$_7$, and "alkyl" denotes a straight-chain alkyl group having 1 to 8 C atoms. Particular preference is given to compounds of the formulae IIa and IIf, in particular in which R$^{3a}$ denotes H or CH$_3$, and compounds of the formula IIc, in particular in which R$^{3a}$ and R$^{4a}$ denote H, CH$_3$ or C$_2$H$_5$.

The compounds of the formula III are preferably selected from the following formulae:

IIIa

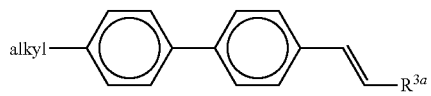

IIIb

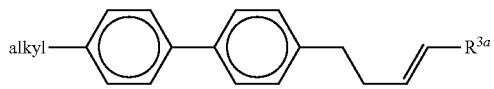

in which "alkyl" and R$^{3a}$ have the meanings indicated above, and R$^{3a}$ preferably denotes H or CH$_3$. Particular preference is given to compounds of the formula IIIb;

The medium additionally comprises one or more compounds selected from the following formulae:

IV

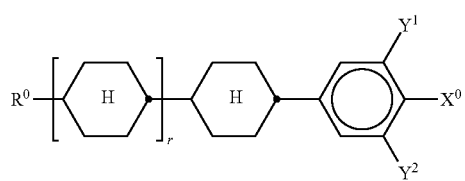

V

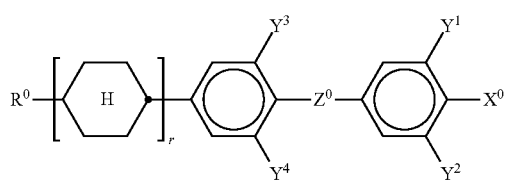

VI

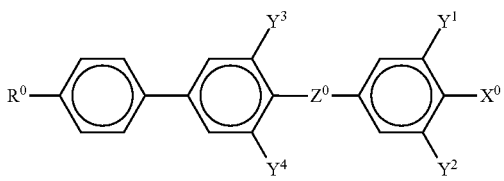

VII

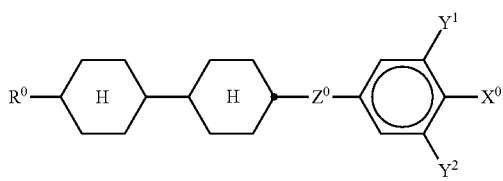

VIII

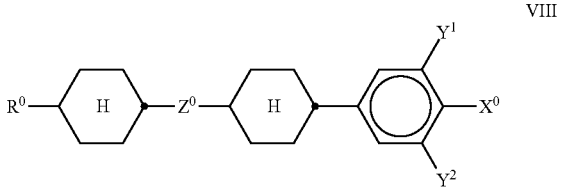

in which

R$^0$ and X$^0$ have the meanings indicated in formula I, and

Y$^{1-4}$ each, independently of one another, denote H or F,

Z$^0$ denotes —C$_2$H$_4$—, —(CH$_2$)$_4$—, —CH=CH—, —CF=CF—, —C$_2$F$_4$—, —CH$_2$CF$_2$—, —CF$_2$CH$_2$—, —CH$_2$O—, —OCH$_2$—, —COO—, —CF$_2$O— or —OCF$_2$—, in formulae V and VI also a single bond, and r denotes 0 or 1.

The compounds of the formula IV are preferably selected from the following formulae:

IVa

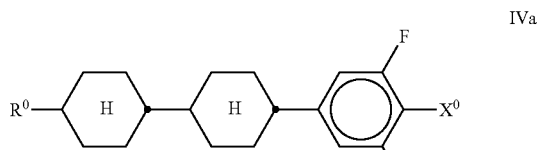

IVb

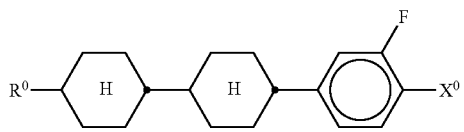

IVc

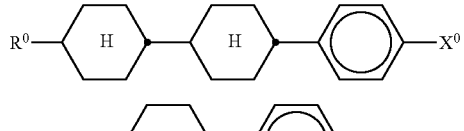

IVd

IVe

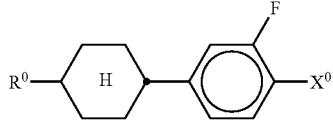

IVf

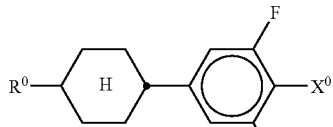

in which R$^0$ and X$^0$ have the meanings indicated above. In formula IV, R$^0$ preferably denotes alkyl having 1 to 8 C atoms, and X$^0$ preferably denotes F, Cl, OCHF$_2$ or OCF$_3$;

The compounds of the formula V are preferably selected from the following formulae:

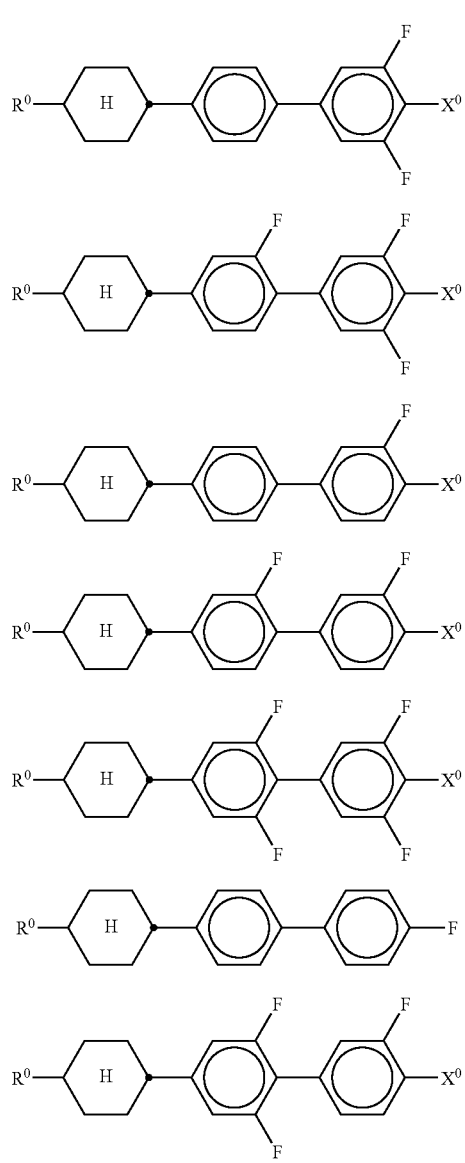

in which R⁰ and X⁰ have the meanings indicated above. In formula V, R⁰ preferably denotes alkyl having 1 to 8 C atoms, and X⁰ preferably denotes F;

The medium comprises one or more compounds of the formula VI-1

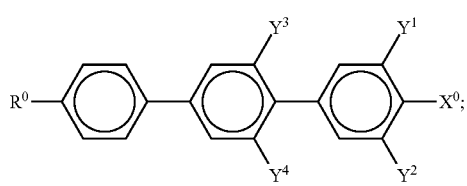

particularly preferably those selected from the following formulae:

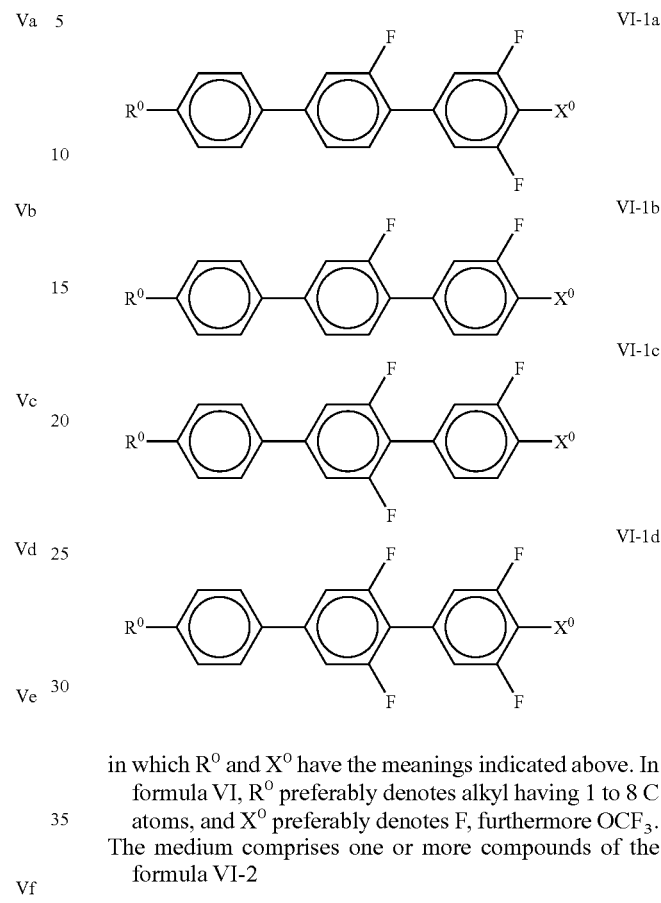

in which R⁰ and X⁰ have the meanings indicated above. In formula VI, R⁰ preferably denotes alkyl having 1 to 8 C atoms, and X⁰ preferably denotes F, furthermore OCF₃.

The medium comprises one or more compounds of the formula VI-2

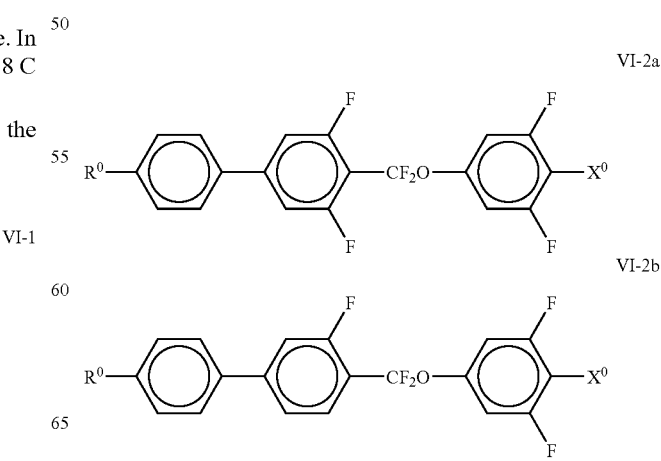

particularly preferably those selected from the following formulae:

VI-2c

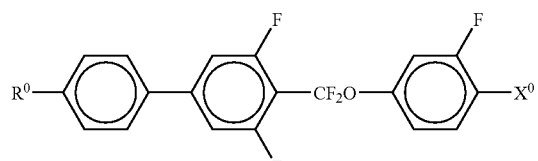

VI-2d

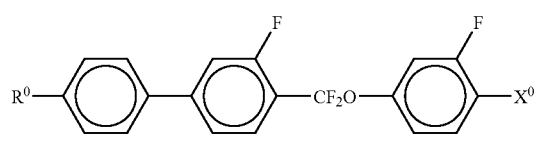

in which R⁰ and X⁰ have the meanings indicated above. In formula VI, R⁰ preferably denotes alkyl having 1 to 8 C atoms, and X⁰ preferably denotes F;

The medium preferably comprises one or more compounds of the formula VII in which $Z^0$ denotes —CF$_2$O—, —CH$_2$CH$_2$ or —COO—, particularly preferably those selected from the following formulae:

VII-1a

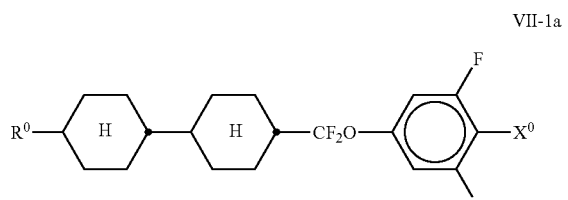

VII-1b

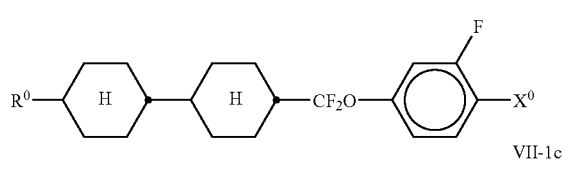

VII-1c

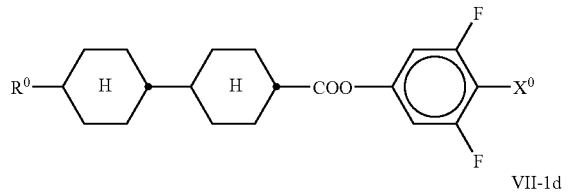

VII-1d

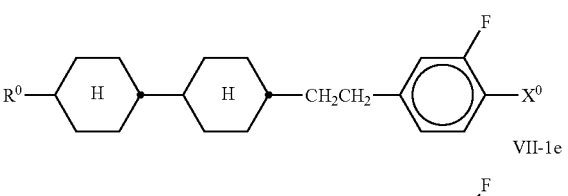

VII-1e

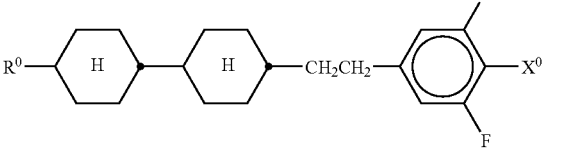

in which R⁰ and X⁰ have the meanings indicated above. In formula VII, R⁰ preferably denotes alkyl having 1 to 8 C atoms, and X⁰ preferably denotes F, furthermore OCF$_3$.

The compounds of the formula VIII are preferably selected from the following formulae:

VIIIa

VIIIb

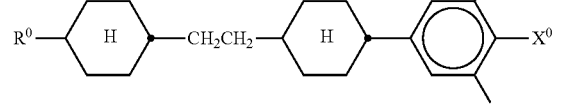

VIIIc

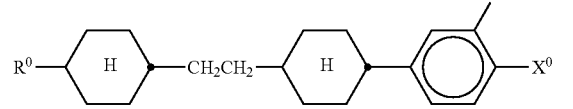

VIIId

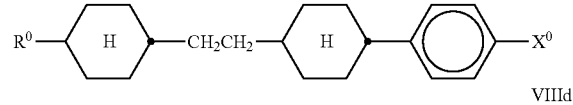

VIIIe

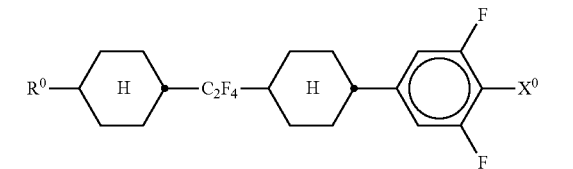

VIIIf

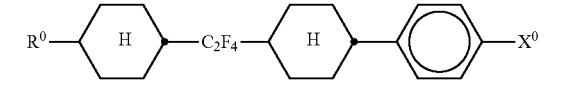

in which R⁰ and X⁰ have the meanings indicated above. R⁰ preferably denotes a straight-chain alkyl radical having 1 to 8 C atoms. X⁰ preferably denotes F.

The medium additionally comprises one or more compounds of the following formula:

IX

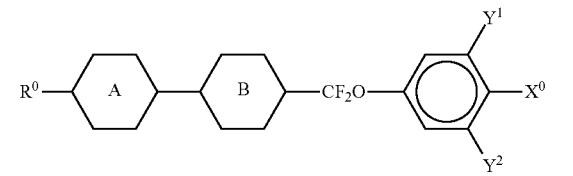

in which R⁰, X⁰, Y¹ and Y² have the meaning indicated above, and

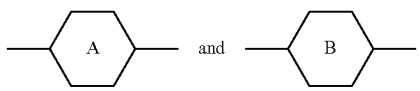

each, independently of one another, denote

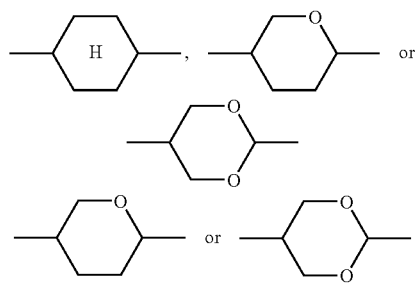

where rings A and B do not both simultaneously denote cyclohexylene;

The compounds of the formula IX are preferably selected from the following formulae:

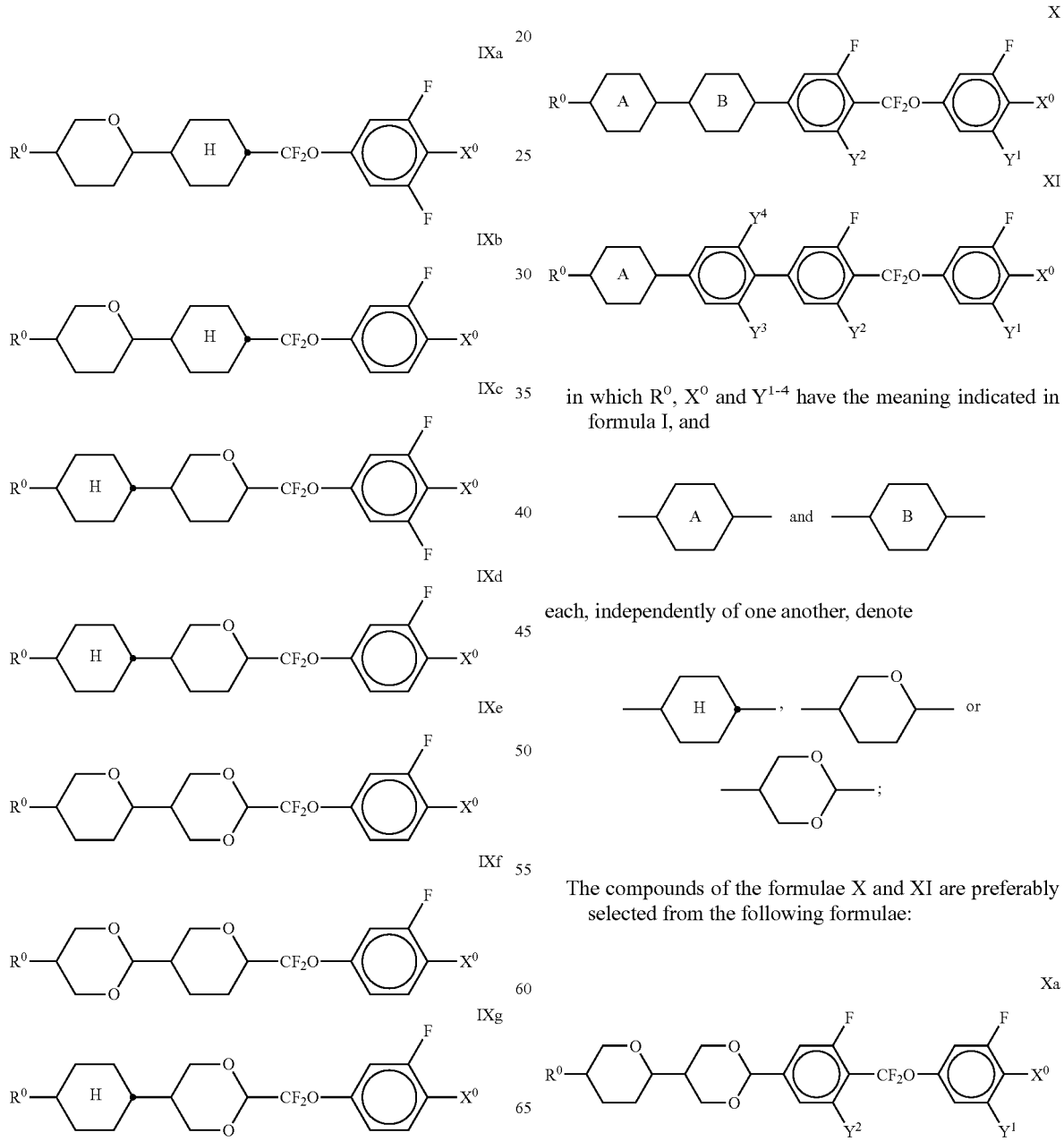

in which $R^0$ and $X^0$ have the meanings indicated above. $R^0$ preferably denotes alkyl having 1 to 8 C atoms, and $X^0$ preferably denotes F. Particular preference is given to compounds of the formula IXa;

The medium additionally comprises one or more compounds selected from the following formulae:

in which $R^0$, $X^0$ and $Y^{1-4}$ have the meaning indicated in formula I, and each, independently of one another, denote The compounds of the formulae X and XI are preferably selected from the following formulae:

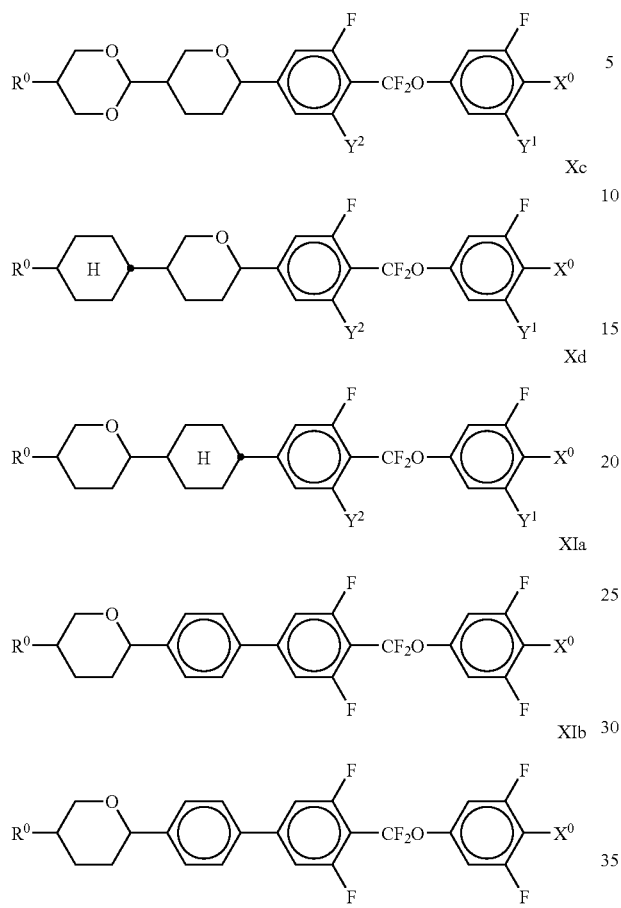

in which $R^0$ and $X^0$ have the meanings indicated above. $R^0$ preferably denotes alkyl having 1 to 8 C atoms, and $X^0$ preferably denotes F. Particularly preferred compounds are those in which $Y^1$ denotes F and $Y^2$ denotes H or F, preferably F;

The medium additionally comprises one or more compounds of the following formula:

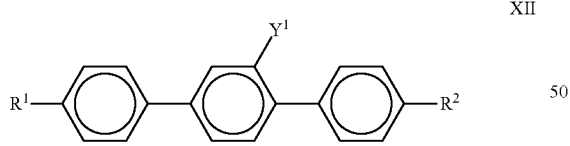

in which $R^1$ and $R^2$ each, independently of one another, denote n-alkyl, alkoxy, oxaalkyl, fluoroalkyl or alkenyl, each having up to 9 C atoms, and preferably each, independently of one another, denote alkyl having 1 to 8 C atoms. $Y^1$ denotes H or F.

Preferred compounds of the formula XII are the compounds of the formulae

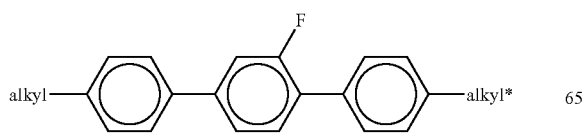

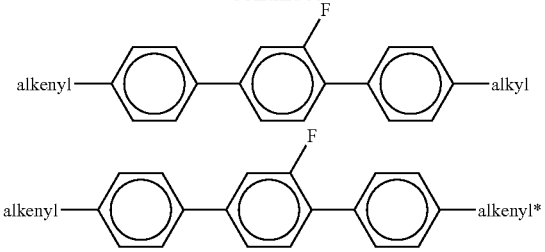

in which
alkyl and alkyl* each, independently of one another, denote a straight-chain alkyl radical having 1 to 6 C atoms, and
alkenyl and
alkenyl* each, independently of one another, denote a straight-chain alkenyl radical having 2 to 6 C atoms.

The medium additionally comprises one or more compounds selected from the following formulae:

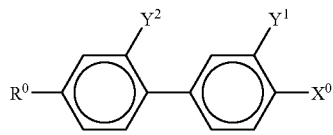

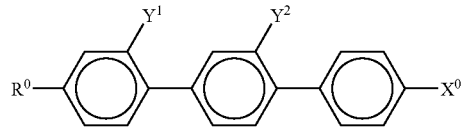

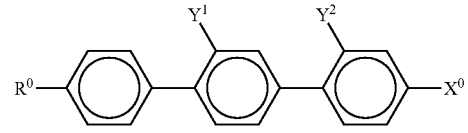

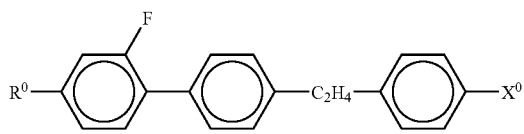

in which $R^0$, $X^0$, $Y^1$ and $Y^2$ have the meanings indicated above. $R^0$ preferably denotes alkyl having 1 to 8 C atoms, and $X^0$ preferably denotes F or Cl;

The compounds of the formulae XIII and XIV are preferably selected from the following formulae:

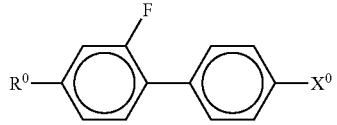

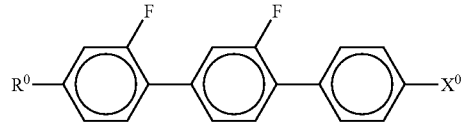

XVa

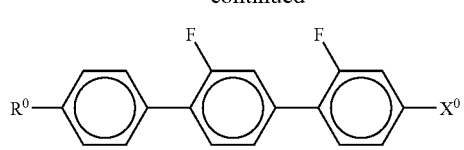

in which $R^0$ and $X^0$ have the meanings indicated above. $R^0$ preferably denotes alkyl having 1 to 8 C atoms. In the compounds of the formula XIII, $X^0$ preferably denotes F or Cl.

The medium additionally comprises one or more compounds of the following formulae D1 and/or D2:

D1

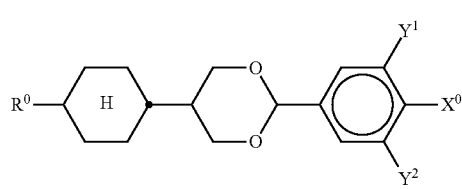

D2

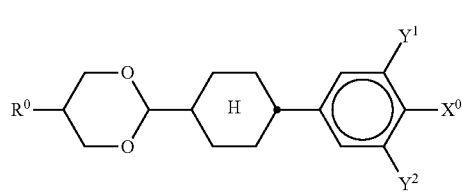

in which $Y^1$, $Y^2$, $R^0$ and $X^0$ have the meaning indicated above. $R^0$ preferably denotes alkyl having 1 to 8 C atoms, and $X^0$ preferably denotes F. Particular preference is given to compounds of the formulae

D1-1

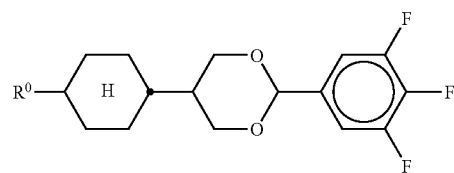

D2-1

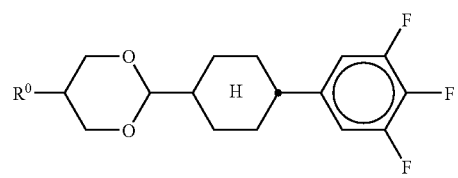

in which $R^0$ has the meanings indicated above and preferably denotes straight-chain alkyl having 1 to 6 C atoms, in particular $C_2H_5$, $n-C_3H_7$ or $n-C_5H_{11}$.

The medium additionally comprises one or more compounds of the following formula:

XVII

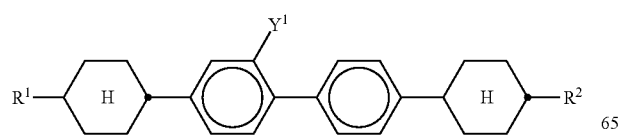

in which $Y^1$, $R^1$ and $R^2$ have the meaning indicated above. $R^1$ and $R^2$ preferably each, independently of one another, denote alkyl having 1 to 8 C atoms;

The medium additionally comprises one or more compounds of the following formula:

XVIII

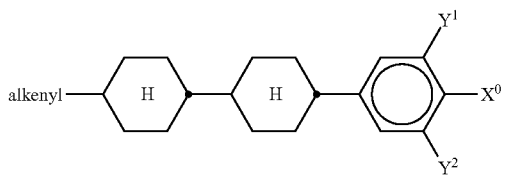

in which $X^0$, $Y^1$ and $Y^2$ have the meanings indicated above, and "alkenyl" denotes $C_{2-7}$-alkenyl. Particular preference is given to compounds of the following formula:

XVIIIa

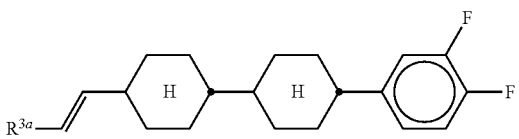

in which $R^{3a}$ has the meaning indicated above and preferably denotes H;

The medium additionally comprises one or more compounds selected from the following formulae:

XIX

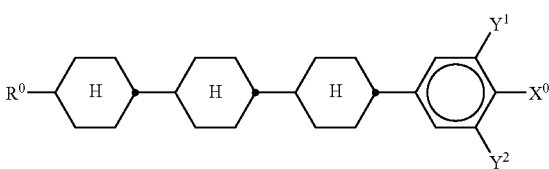

XX

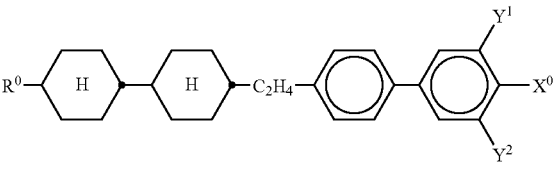

XXI

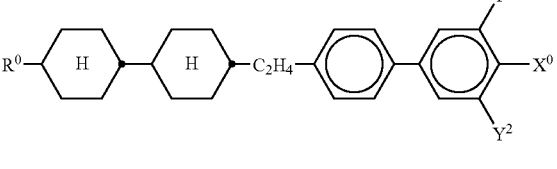

-continued

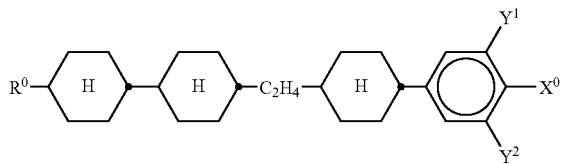

XXII in which $Y^{1-4}$, $R^0$ and $X^0$ each, independently of one another, have one of the meanings indicated above. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

$R^0$ is preferably straight-chain alkyl or alkenyl having 2 to 7 C atoms;

$X^0$ is preferably F, furthermore $OCF_3$, Cl or $CF_3$;

The medium preferably comprises one, two or three compounds of the formula I;

The medium comprises compounds selected from the formulae I, II, III, V, VI-1, VI-2, XII, XIII, XIV and XVI;

The medium preferably comprises one or more compounds of the formula VI-1;

The medium preferably comprises one or more compounds of the formula VI-2;

The medium preferably comprises 1-25% by weight, preferably 1-20% by weight, particularly preferably 2-15% by weight, of compounds of the formula I;

The proportion of compounds of the formulae II-XXII in the mixture as a whole is preferably 20 to 99% by weight;

The medium preferably comprises 25-80% by weight, particularly preferably 30-70% by weight, of compounds of the formulae II and/or III;

The medium preferably comprises 5-40% by weight, particularly preferably 10-30% by weight, of compounds of the formula V;

The medium preferably comprises 3-30% by weight, particularly preferably 6-25% by weight, of compounds of the formula VI-1;

The medium preferably comprises 2-30% by weight, particularly preferably 4-25% by weight, of compounds of the formula VI-2;

The medium comprises 5-40% by weight, particularly preferably 10-30% by weight, of compounds of the formula XII;

The medium preferably comprises 1-25% by weight, particularly preferably 2-15% by weight, of compounds of the formula XIII;

The medium preferably comprises 5-45% by weight, particularly preferably 10-35% by weight, of compounds of the formula XIV;

The medium preferably comprises 1-20% by weight, particularly preferably 2-15% by weight, of compounds of the formula XVI.

It has been found that even a relatively small proportion of compounds of the formula I mixed with conventional liquid-crystal materials, but in particular with one or more compounds of the formulae II to XXII, results in a significant increase in the light stability and in low birefringence values, with broad nematic phases with low smectic-nematic transition temperatures being observed at the same time, improving the shelf life. At the same time, the mixtures exhibit very low threshold voltages and very good values for the VHR on exposure to UV.

The term "alkyl" or "alkyl*" in this application encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" or "alkenyl*" in this application encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" in this application preferably encompasses straight-chain groups having at least one fluorine atom, preferably a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" in this application preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $K_1$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae IV to VIII in which $X^0$ denotes F, $OCF_3$, $OCHF_2$, OCH=$CF_2$, OCF=$CF_2$ or $OCF_2$—$CF_2H$. A favourable synergistic action with the compounds of the formula I results in particularly advantageous properties. In particular, mixtures comprising compounds of the formulae I, V and VI are distinguished by their low threshold voltages.

The individual compounds of the above-mentioned formulae and the sub-formulae thereof which can be used in the media according to the invention are either known or can be prepared analogously to the known compounds.

The invention also relates to electro-optical displays, such as, for example, TN, STN, FFS, OCB, IPS, FFS or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are particularly suitable for mobile applications and high-$\Delta$n TFT applications, such as, for example, PDAs, notebooks, LCD TVs and monitors.

The liquid-crystal mixtures according to the invention, while retaining the nematic phase down to −20° C. and preferably down to −30° C., particularly preferably down to −40° C., and the clearing point ≧70° C., preferably ≧75° C., at the same time allow rotational viscosities $\gamma_1$ of ≦90 mPa·s, particularly preferably ≦70 mPa·s, to be achieved, enabling excellent MLC displays having fast response times to be achieved.

The dielectric anisotropy $\Delta\epsilon$ of the liquid-crystal mixtures according to the invention is preferably ≧+3, particularly preferably ≧+4. In addition, the mixtures are characterised by low operating voltages. The threshold voltage of the liquid-crystal mixtures according to the invention is preferably ≦2.0 V. The birefringence $\Delta$n of the liquid-crystal mixtures according to the invention is preferably ≧0.11, particularly preferably ≧0.12.

The nematic phase range of the liquid-crystal mixtures according to the invention preferably has a width of at least 90°, in particular at least 100°. This range preferably extends at least from −25° C. to +70° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having a higher $\Delta\epsilon$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8,1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR on UV exposure than analogous mixtures comprising cyanophenylcyclohexanes of the formula

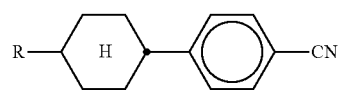

or esters of the formula

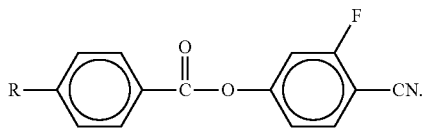

instead of the compounds of the formula I.

The light stability and UV stability of the mixtures according to the invention are considerably better, i.e. they exhibit a significantly smaller decrease in the HR on exposure to light or UV. Even low concentrations of the compounds (<10% by weight) of the formula I in the mixtures increase the HR by 6% or more compared with mixtures from the prior art.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of the formula I with one or more compounds of the formulae II-XXII or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba, antioxidants, free-radical scavengers, nanoparticles, etc. For example, 0-15% of pleochroic dyes or chiral dopants can be added. Suitable stabilisers and dopants are mentioned below in Tables C and D.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are shown in Tables A and B.

TABLE A

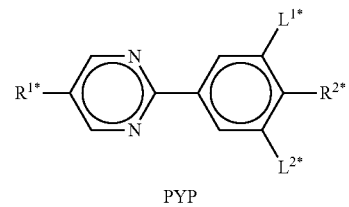

PYP

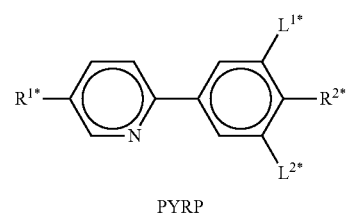

PYRP

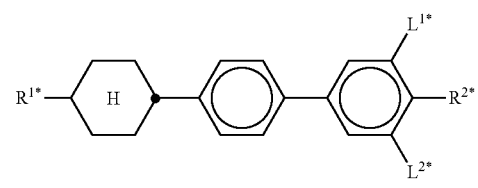

BCH

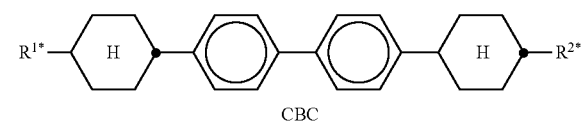

CBC

TABLE A-continued
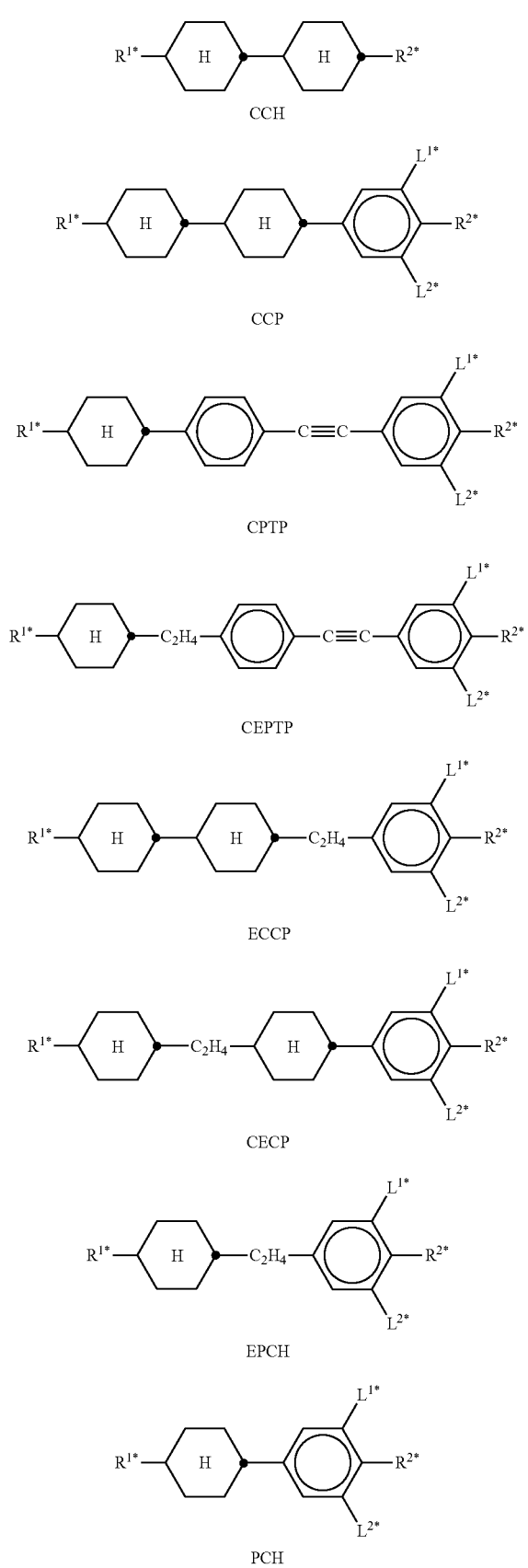
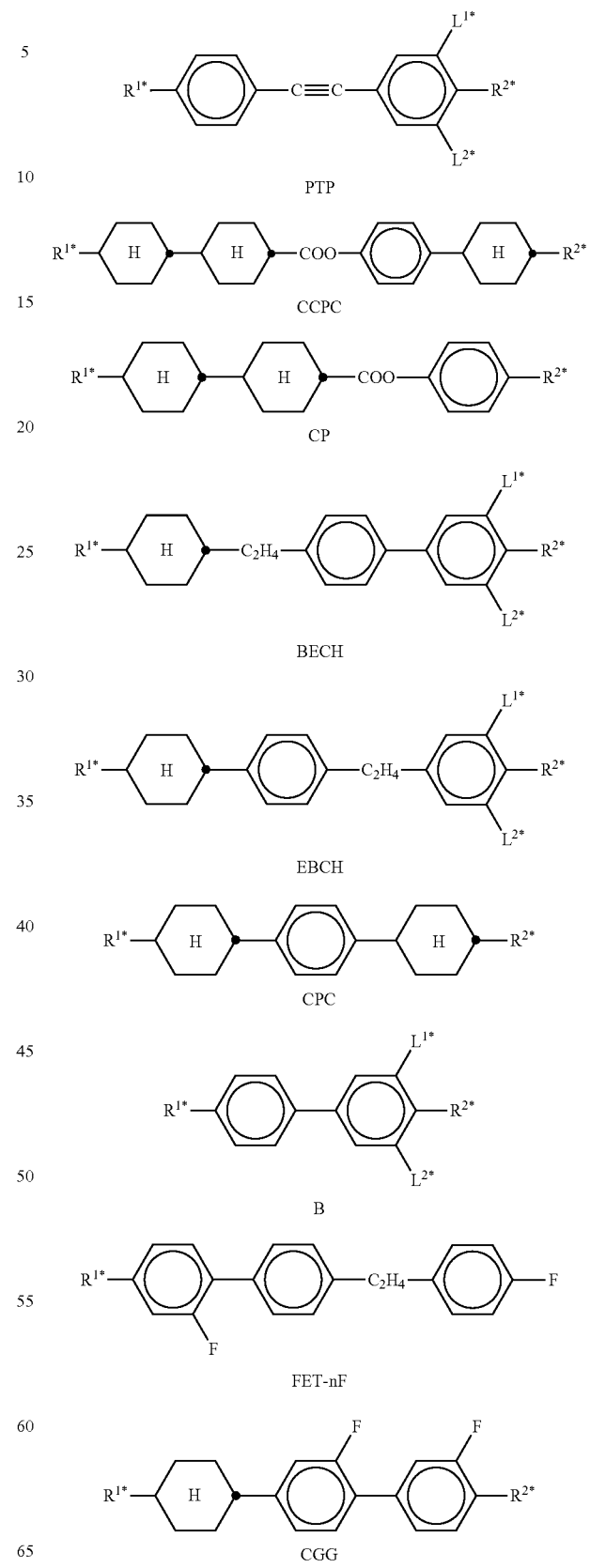

TABLE A-continued
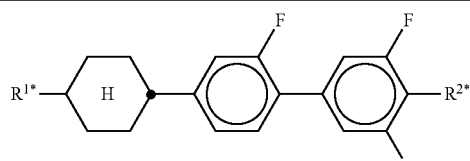
CGU
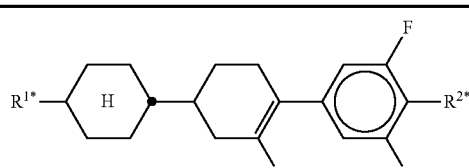
CFU
TABLE B
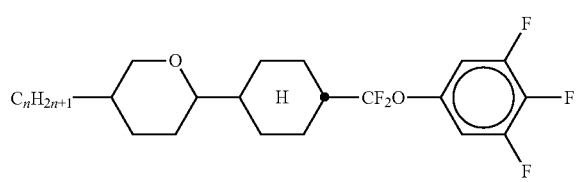
ACQU-n-F
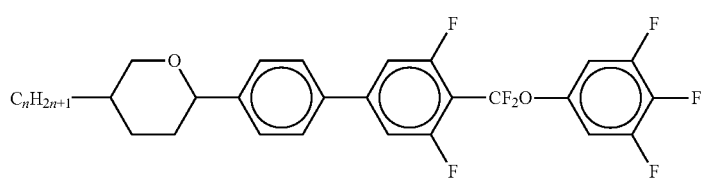
APUQU-n-F
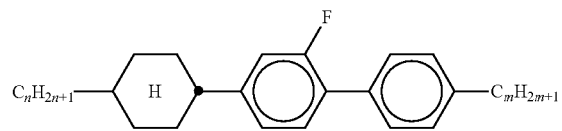
BCH-n.Fm
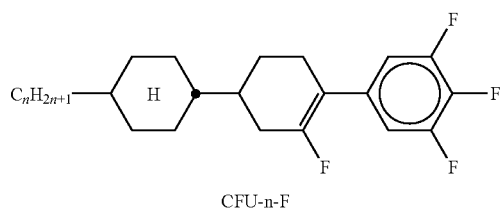
CFU-n-F
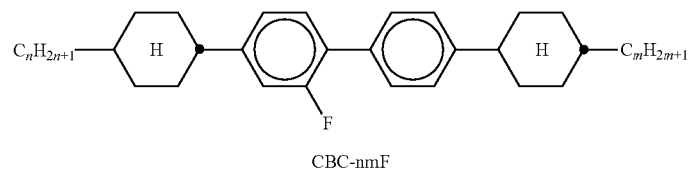
CBC-nmF
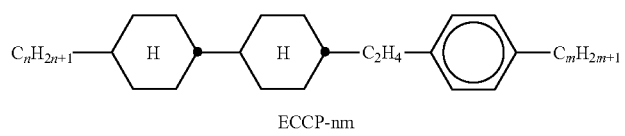
ECCP-nm TABLE B-continued
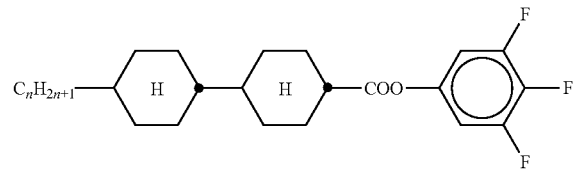
CCZU-n-F
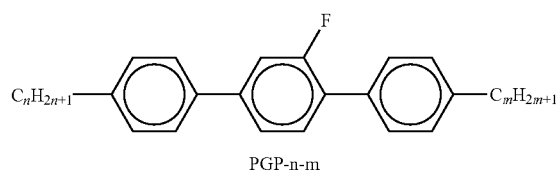
PGP-n-m
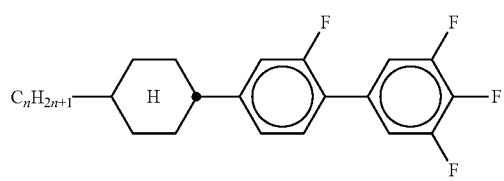
CGU-n-F
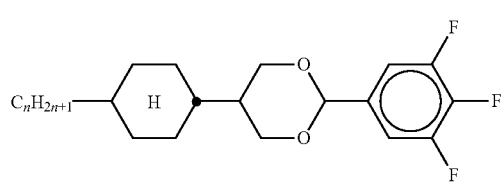
CDU-n-F
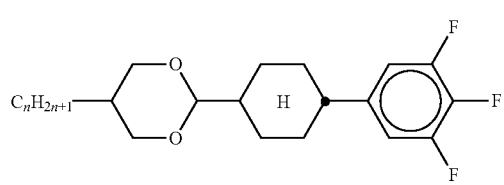
DCU-n-F
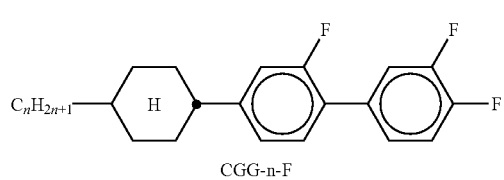
CGG-n-F
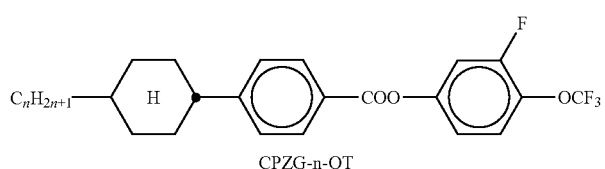
CPZG-n-OT
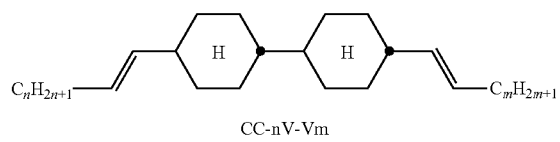
CC-nV-Vm TABLE B-continued
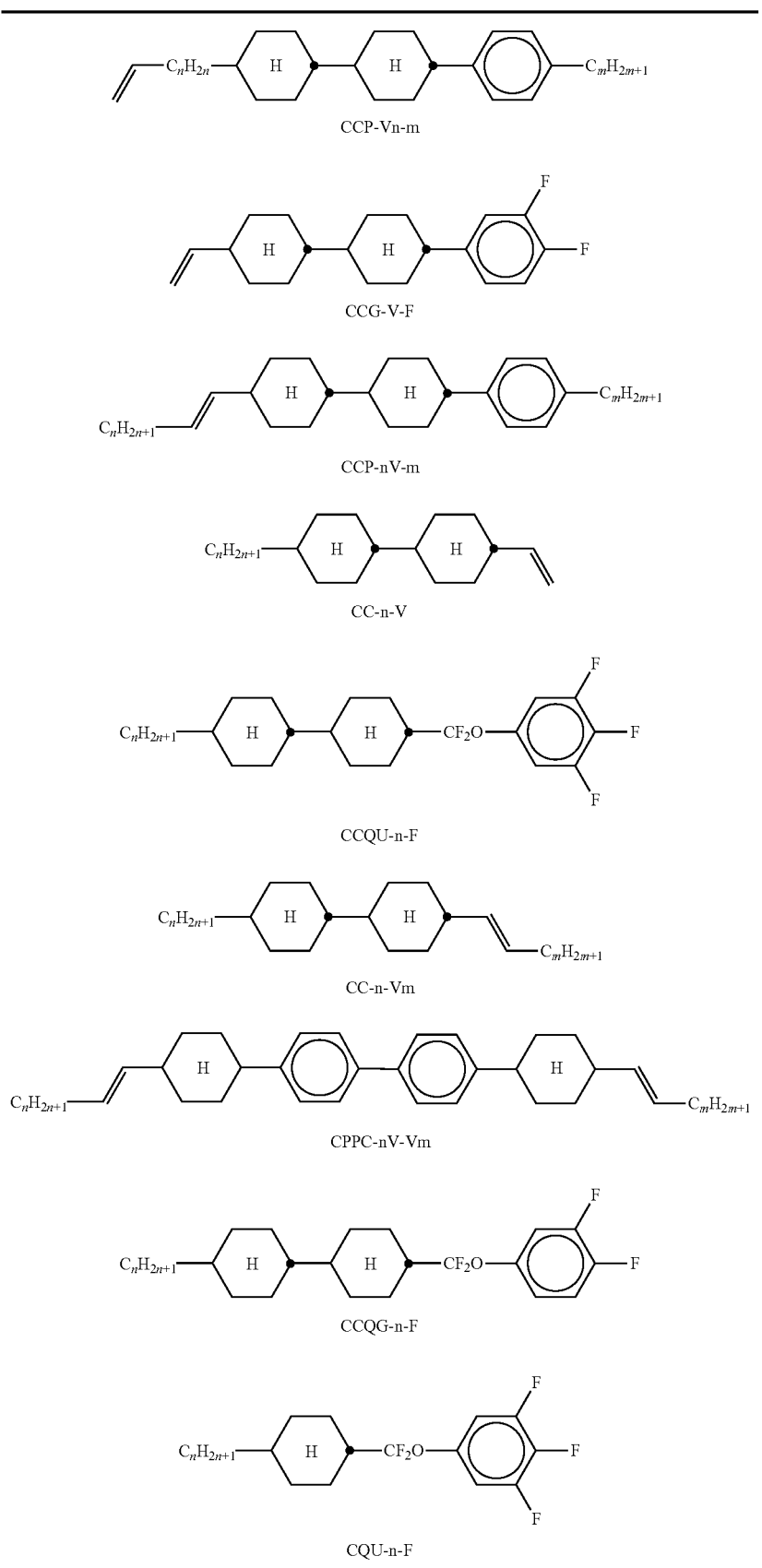

TABLE B-continued
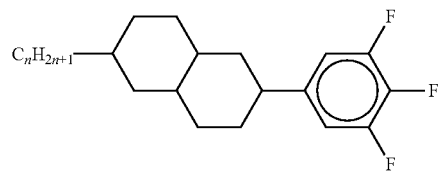
Dec-U-n-F
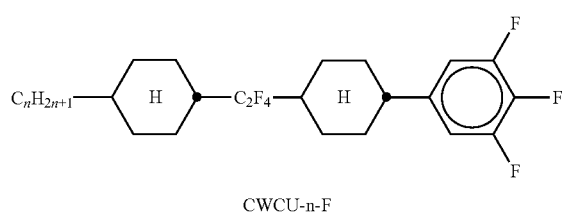
CWCU-n-F
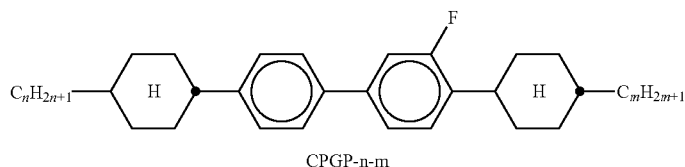
CPGP-n-m
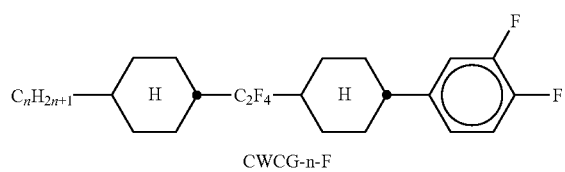
CWCG-n-F
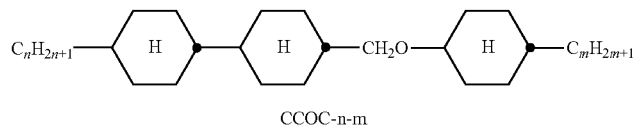
CCOC-n-m
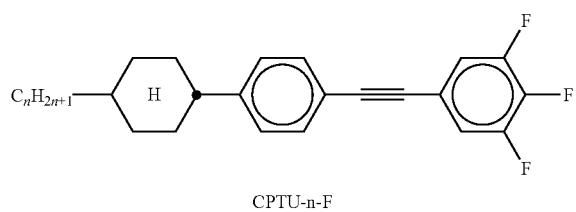
CPTU-n-F
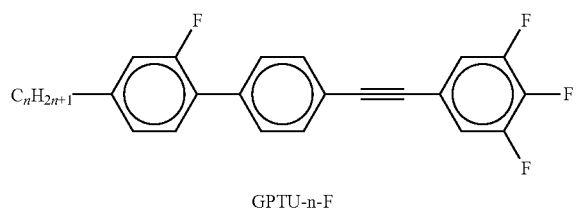
GPTU-n-F
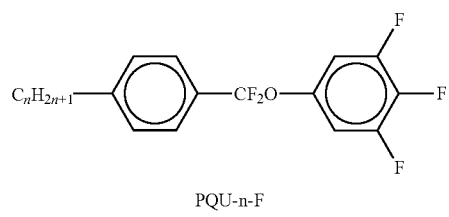
PQU-n-F TABLE B-continued
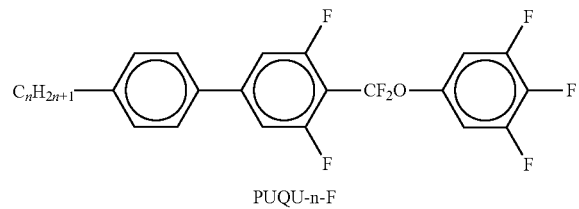
PUQU-n-F
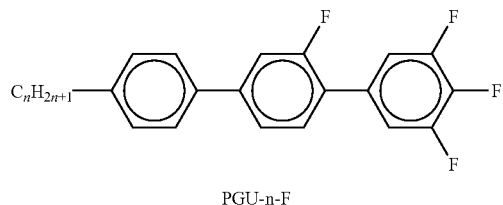
PGU-n-F
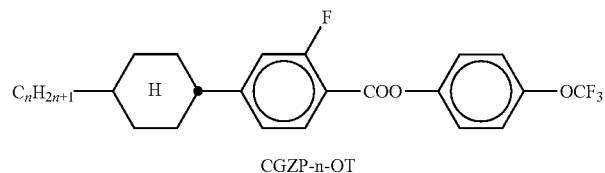
CGZP-n-OT
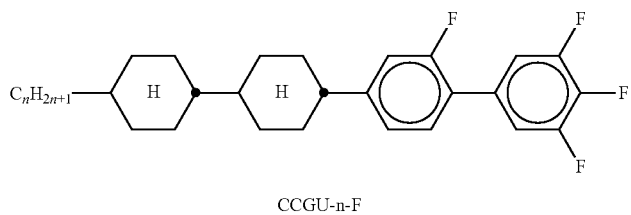
CCGU-n-F
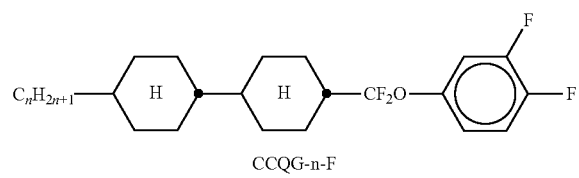
CCQG-n-F
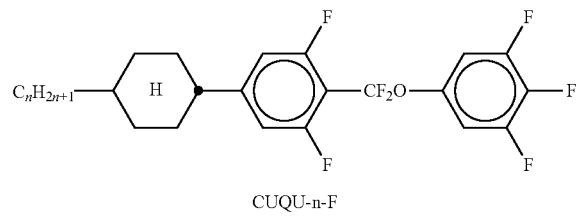
CUQU-n-F
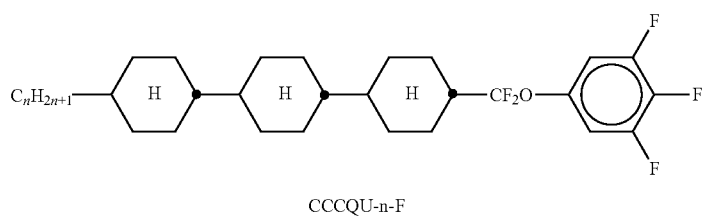
CCCQU-n-F TABLE B-continued
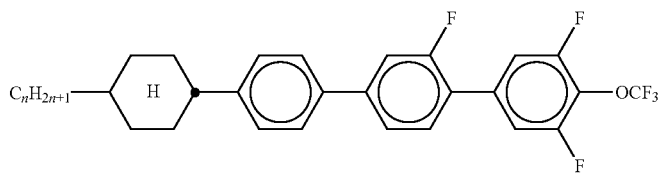
CPGU-n-OT
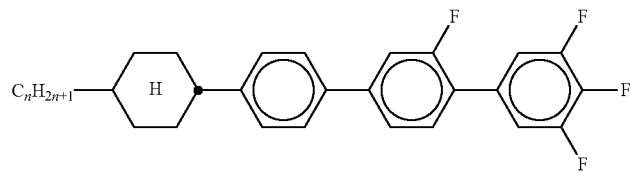
CPGU-n-F
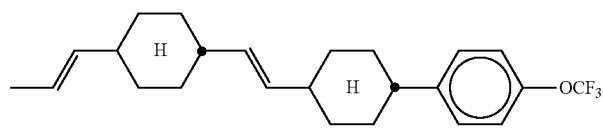
CVCP-1V-OT
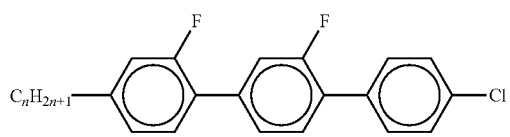
GGP-n-Cl
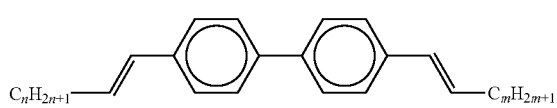
PP-nV-Vm
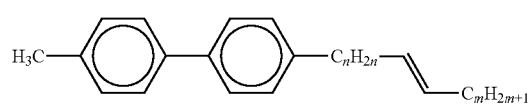
PP-1-nVm
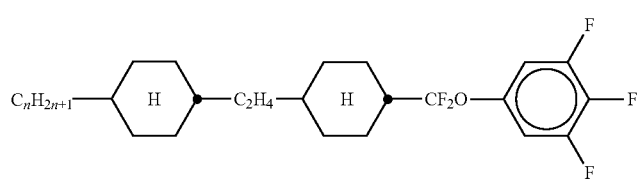
CWCQU-n-F
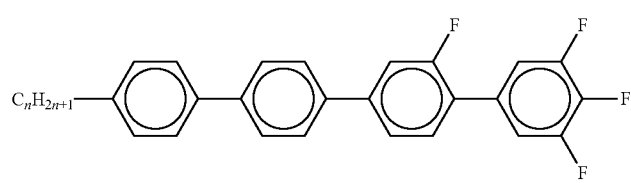
PPGU-n-F TABLE B-continued
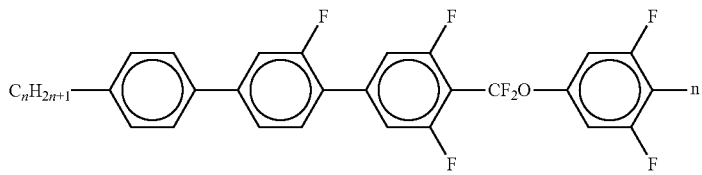
PGUQU-n-F
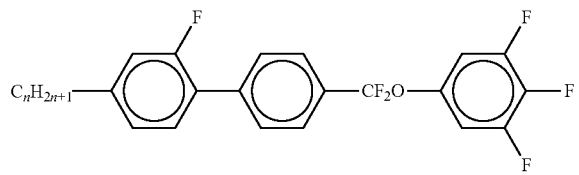
GPQU-n-F
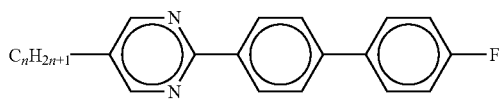
MPP-n-F
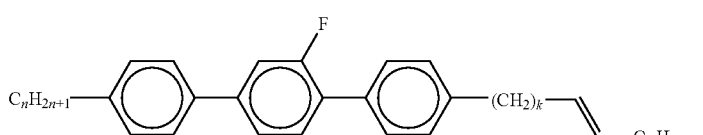
PGP-n-kVm
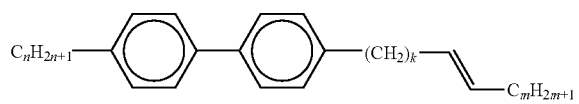
PP-n-kVm
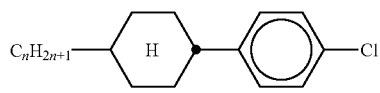
PCH-nCl
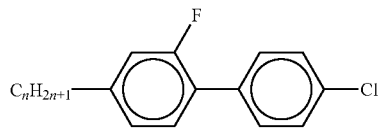
GP-n-Cl
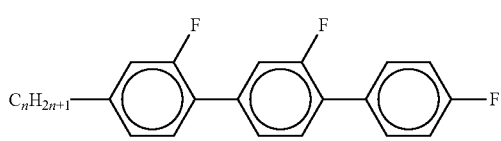
GGP-n-F
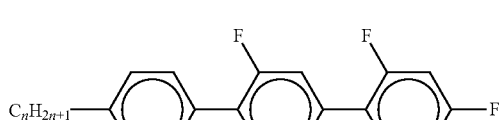
PGIGI-n-F Particular preference is given to liquid-crystalline mixtures which, besides the compounds of the formula I, comprise at least one, two, three, four or more compounds from Table B.

TABLE C

Table C indicates possible dopants which are generally added to the mixtures according to the invention. The mixtures preferably comprise 0-10% by weight, in particular 0.01-5% by weight and particularly preferably 0.01-3% by weight of dopants.

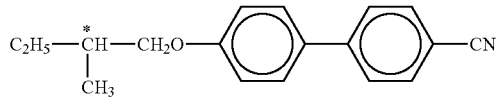

C 15

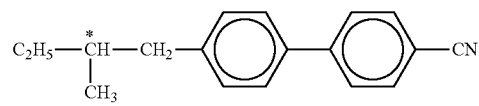

CB 15

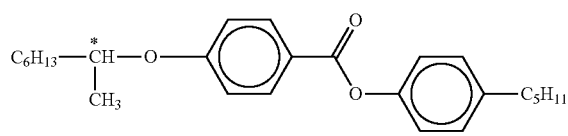

CM 21

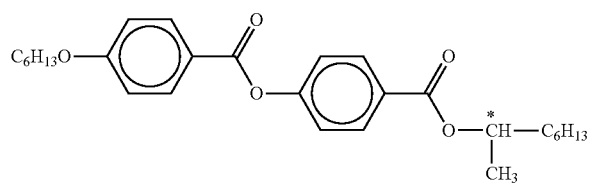

R/S-811

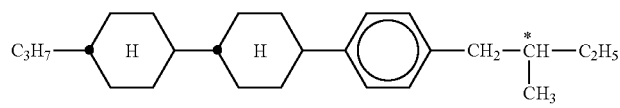

CM 44

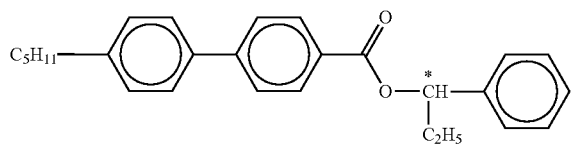

CM 45

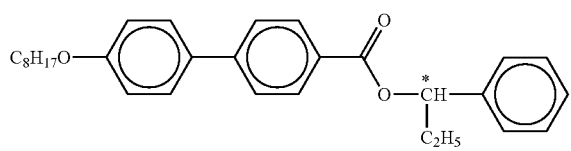

CM 47

TABLE C-continued
Table C indicates possible dopants which are generally added to the mixtures according to the invention. The mixtures preferably comprise 0-10% by weight, in particular 0.01-5% by weight and particularly preferably 0.01-3% by weight of dopants.
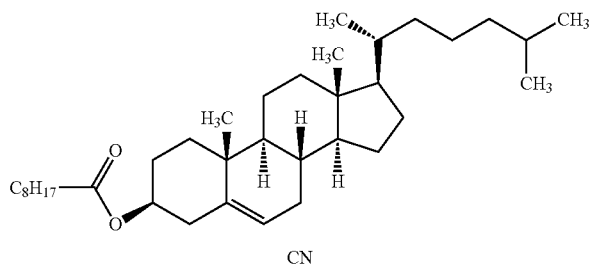
CN
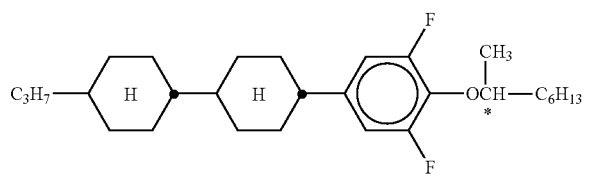
R/S-2011
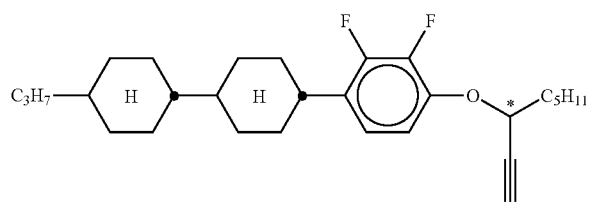
R/S-3011
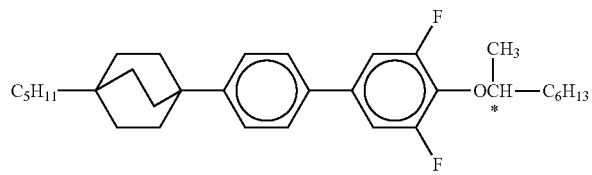
R/S-4011
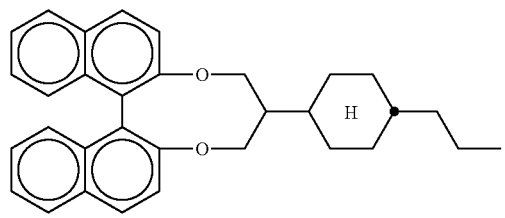
R/S-5011
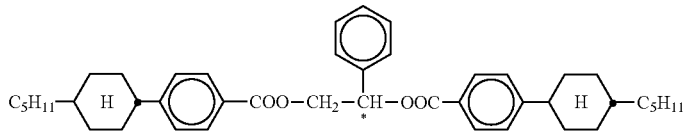
R/S-1011

TABLE D
Stabilisers which can be added, for example, to the mixtures according to the invention in amounts of 0-10% by weight are mentioned below.
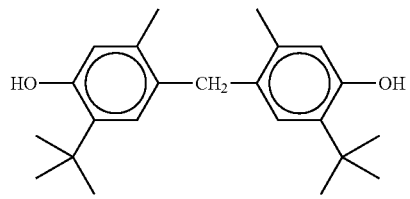
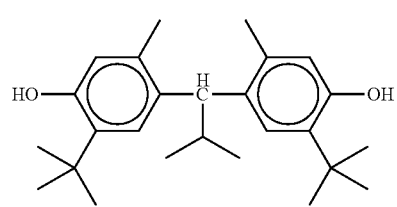
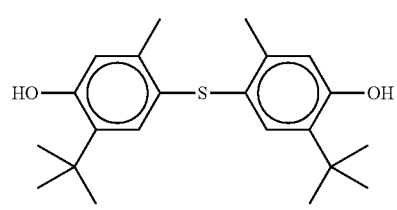
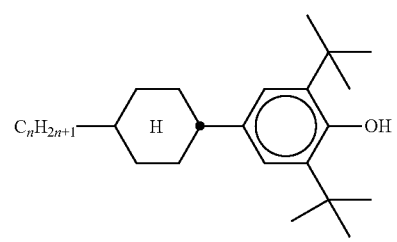
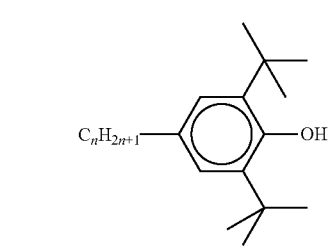
n = 1, 2, 3, 4, 5, 6 or 7
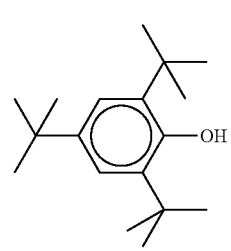
TABLE D-continued
Stabilisers which can be added, for example, to the mixtures according to the invention in amounts of 0-10% by weight are mentioned below.
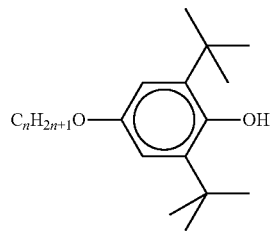
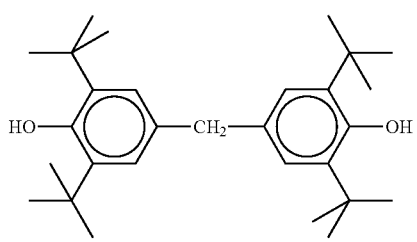
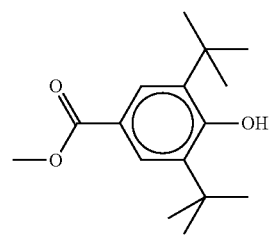
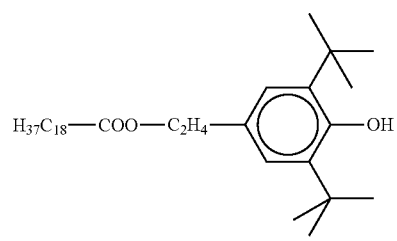
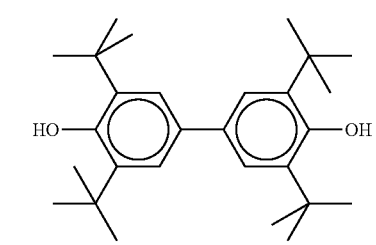

TABLE D-continued
Stabilisers which can be added, for example, to the mixtures according to the invention in amounts of 0-10% by weight are mentioned below.
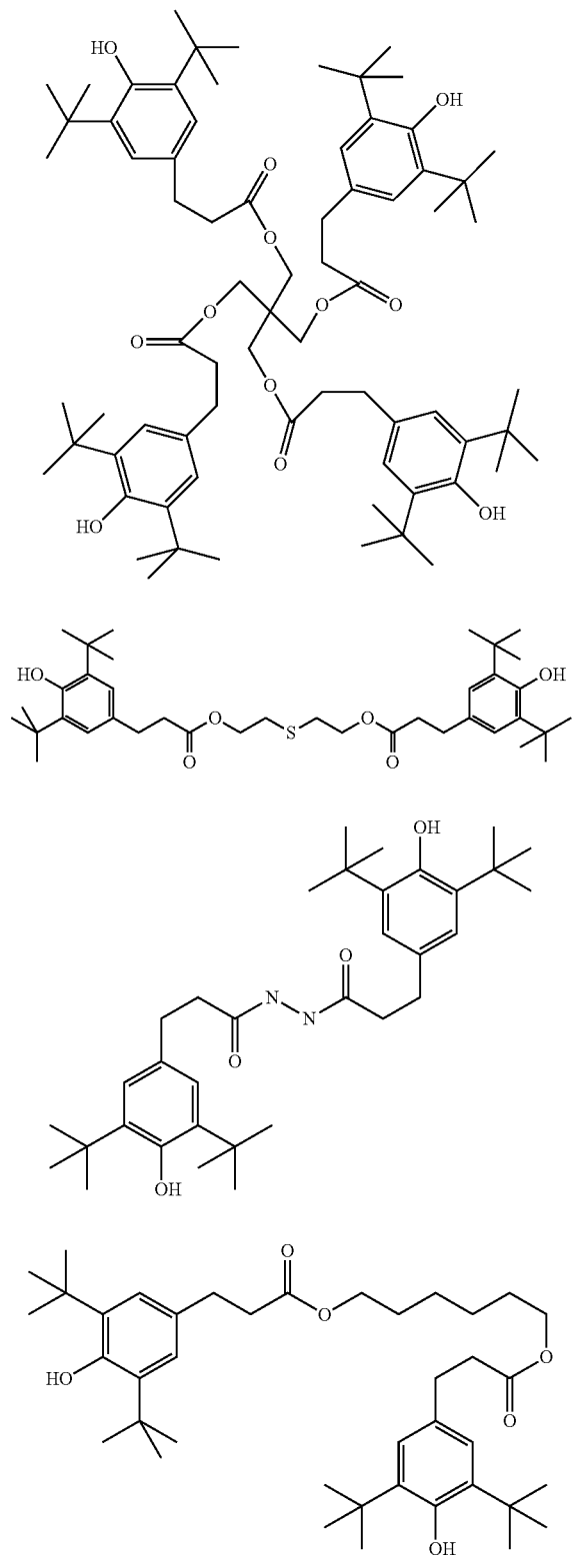
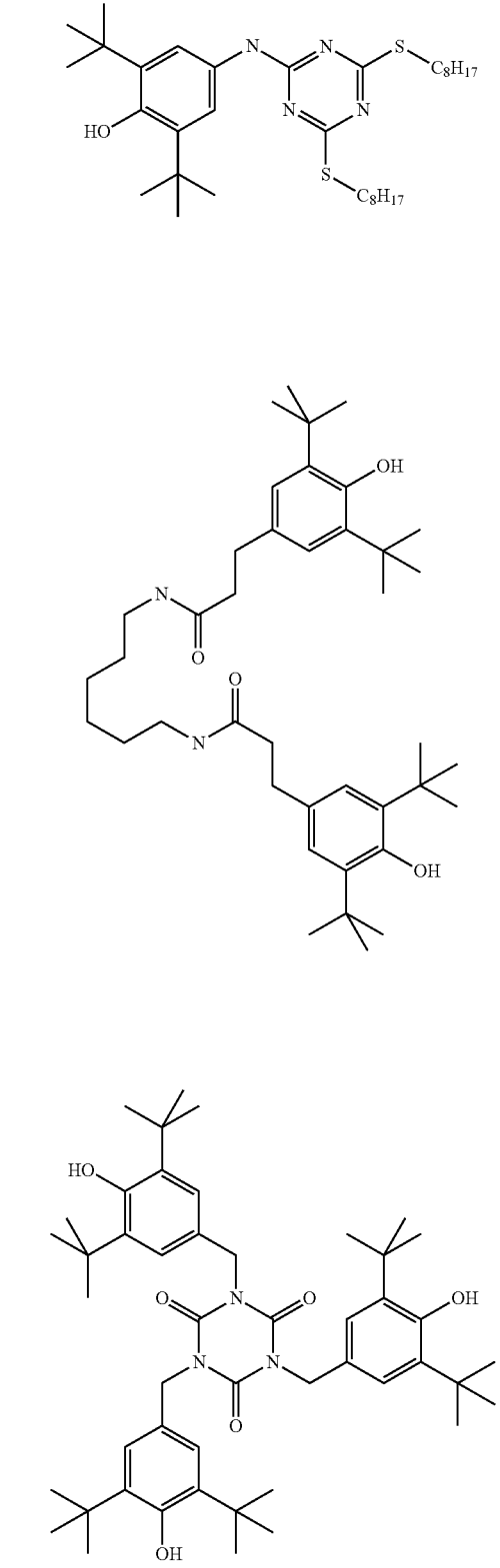

TABLE D-continued
Stabilisers which can be added, for example, to the mixtures according to the invention in amounts of 0-10% by weight are mentioned below.
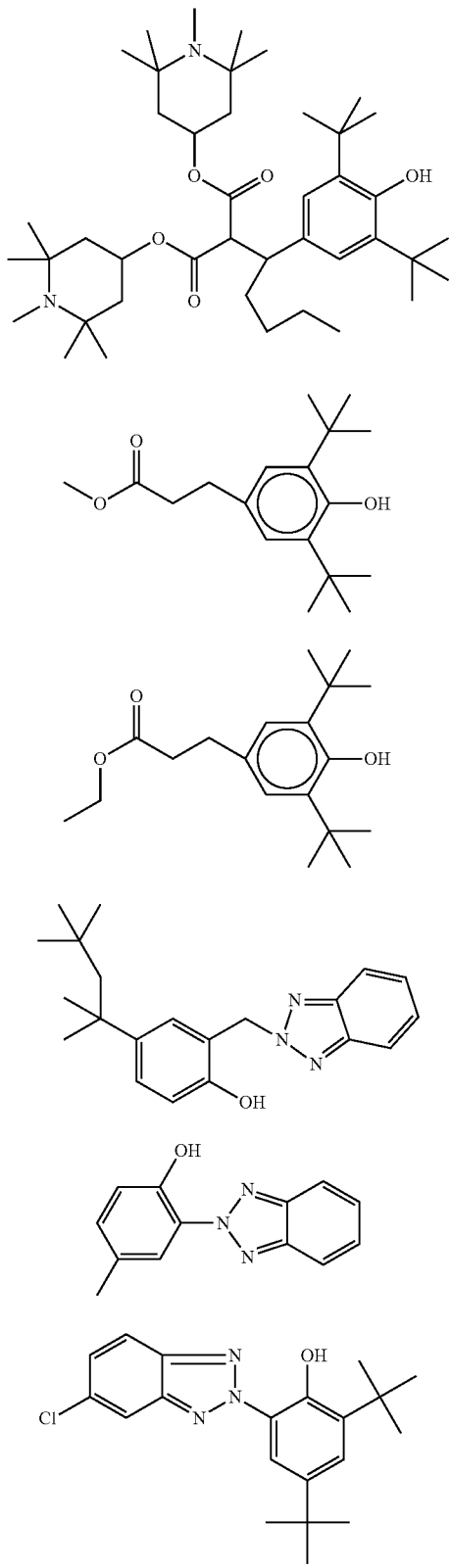
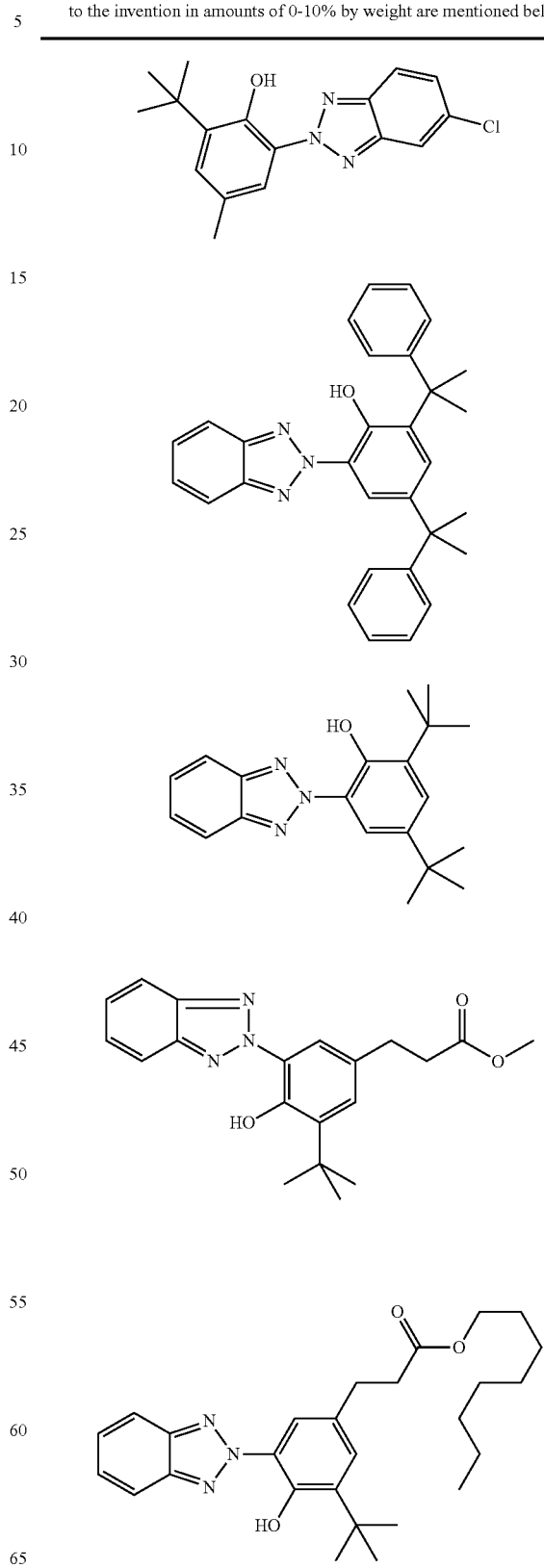

TABLE D-continued

Stabilisers which can be added, for example, to the mixtures according to the invention in amounts of 0-10% by weight are mentioned below.

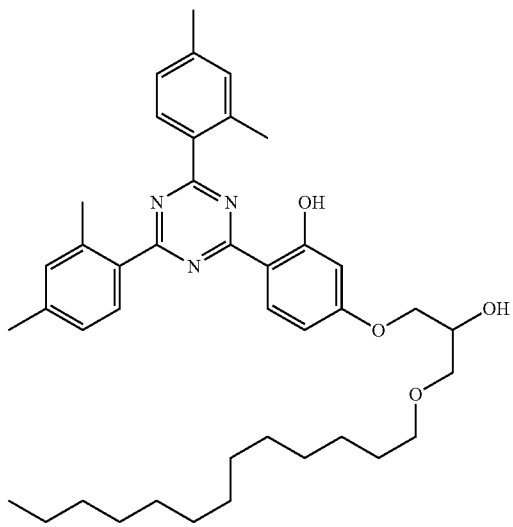 [SMILES: CCCCCCCCCCCCCOCC(O)COc1ccc(-c2nc(-c3ccc(C)cc3C)nc(-c3ccc(C)cc3C)n2)c(O)c1]

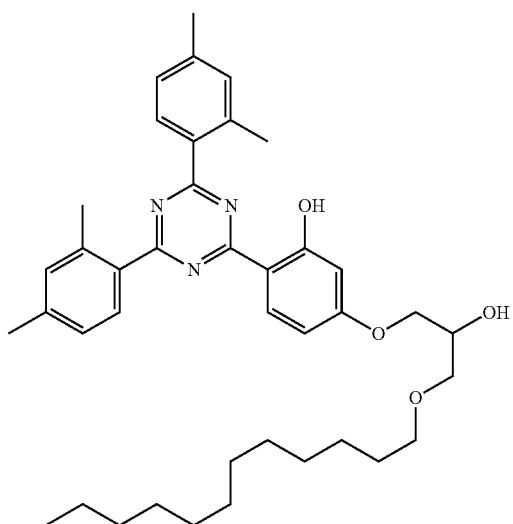 [SMILES: CCCCCCCCCCCCOCC(O)COc1ccc(-c2nc(-c3ccc(C)cc3C)nc(-c3ccc(C)cc3C)n2)c(O)c1]

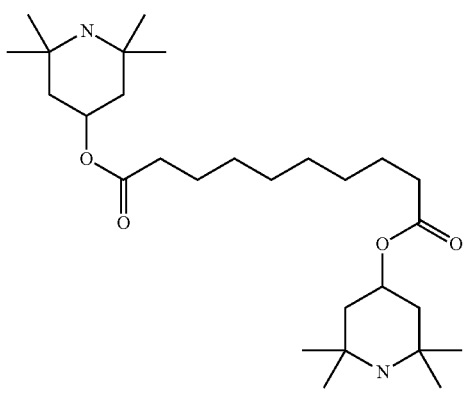

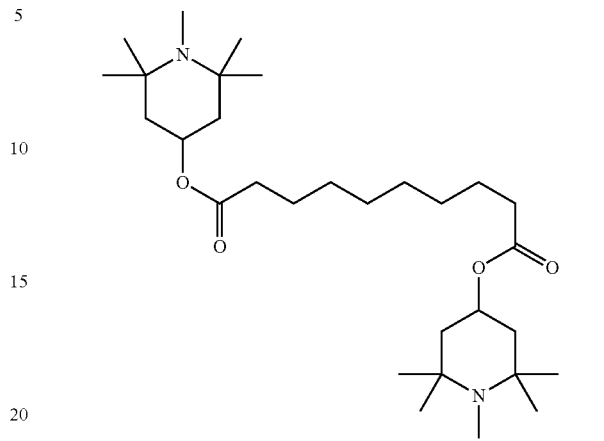

The following examples are intended to explain the invention without limiting it.

Above and below, percentage data denote per cent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, Δn denotes the optical anisotropy at 589 nm and 20° C., $\gamma_1$ denotes the rotational viscosity (mPa·s) at 20° C., $V_{10}$ denotes the voltage (V) for a 10% transmission (viewing angle perpendicular to the plate surface), (threshold voltage), Δε denotes the dielectric anisotropy at 20° C. and 1 kHz ($\Delta\epsilon = \epsilon_\parallel - \epsilon_\perp$, where $\epsilon_\parallel$ denotes the dielectric constant parallel to the longitudinal axes of the molecules and $\epsilon_\perp$ denotes the dielectric constant perpendicular thereto).

The electro-optical data are measured in a TN cell at the 1st minimum (i.e. at a d·Δn value of 0.5 μm) at 20° C., unless expressly indicated otherwise. The optical data are measured at 20° C., unless expressly indicated otherwise. All physical properties are determined in accordance with "Merck Liquid Crystals, Physical Properties of Liquid Crystals", status November 1997, Merck KGaA, Germany, and apply for a temperature of 20° C., unless explicitly indicated otherwise.

COMPARATIVE EXAMPLE 1

| | | | |
|---|---|---|---|
| GGP-3-Cl | 7.00% | Clearing point [° C.]: | 75.0 |
| GGP-5-Cl | 3.00% | Δn [589 nm, 20° C.]: | 0.1266 |
| PGU-2-F | 5.00% | Δε [kHz, 20° C.]: | +4.6 |
| PGU-3-F | 5.00% | $\gamma_1$ [mPa·s, 20° C.]: | 60 |
| PUQU-2-F | 4.00% | $V_{10}$ [V]: | 1.89 |
| PUQU-3-F | 3.00% | | |
| CCP-V-1 | 19.00% | | |
| CC-3-V1 | 7.00% | | |
| PGP-2-3 | 6.00% | | |
| PGP-2-4 | 6.00% | | |
| CC-3-V | 32.00% | | |
| PCH-3Cl | 3.00% | | |

EXAMPLE 1

| | | | |
|---|---|---|---|
| CPGU-2-F | 3.00% | Clearing point [° C.]: | 74.0 |
| CPGU-3-F | 3.00% | Δn [589 nm, 20° C.]: | 0.1263 |
| PGU-2-F | 5.00% | Δε [kHz, 20° C.]: | +4.6 |
| PGU-3-F | 5.00% | $\gamma_1$ [mPa · s, 20° C.]: | 57 |
| PUQU-2-F | 6.00% | $V_{10}$ [V]: | 1.90 |
| CCP-V-1 | 15.00% | | |
| CC-3-V1 | 6.00% | | |
| PGP-2-3 | 5.00% | | |
| PGP-2-4 | 6.00% | | |
| PGP-2-5 | 6.00% | | |
| CC-3-V | 35.00% | | |
| GP-2-Cl | 5.00% | | |

The mixture has lower viscosity than the mixture from Comparative Example 1 with virtually the same birefringence and virtually the same clearing point.

EXAMPLE 2

| | | | |
|---|---|---|---|
| CPGU-2-OT | 2.00% | Clearing point [° C.]: | 74.0 |
| CPGU-3-OT | 3.00% | Δn [589 nm, 20° C.]: | 0.1260 |
| PGU-2-F | 5.00% | Δε [kHz, 20° C.]: | +4.6 |
| PGU-3-F | 5.00% | $\gamma_1$ [mPa · s, 20° C.]: | 57 |
| PUQU-2-F | 4.00% | $V_{10}$ [V]: | 1.92 |
| PUQU-3-F | 3.00% | | |
| CCP-V-1 | 13.00% | | |
| CC-3-V1 | 7.00% | | |
| PGP-2-3 | 6.00% | | |
| PGP-2-4 | 6.00% | | |
| PGP-2-5 | 7.00% | | |
| CC-3-V | 36.00% | | |
| GP-2-Cl | 3.00% | | |

The mixture has lower viscosity than the mixture from Comparative Example 1 with virtually the same birefringence and virtually the same clearing point.

COMPARATIVE EXAMPLE 2

| | | | |
|---|---|---|---|
| GGP-3-Cl | 9.00% | Clearing point [° C.]: | 74.5 |
| GGP-5-Cl | 11.00% | Δn [589 nm, 20° C.]: | 0.1407 |
| BCH-3F.F.F | 16.00% | Δε [kHz, 20° C.]: | +3.9 |
| CC-3-V1 | 5.00% | $\gamma_1$ [mPa · s, 20° C.]: | 69 |
| PGIGI-3-F | 3.00% | $V_{10}$ [V]: | 2.11 |
| CCP-V-1 | 5.00% | | |
| PGP-2-3 | 4.00% | | |
| PGP-2-4 | 5.00% | | |
| PGP-2-5 | 4.00% | | |
| PP-1-2V1 | 4.00% | | |
| CC-3-V | 34.00% | | |

EXAMPLE 3

| | | | |
|---|---|---|---|
| GGP-3-Cl | 8.00% | Clearing point [° C.]: | 76.5 |
| GGP-5-Cl | 10.00% | Δn [589 nm, 20° C.]: | 0.1421 |
| BCH-3F.F.F | 15.00% | Δε [kHz, 20° C.]: | +4.1 |
| CC-3-V1 | 5.00% | $\gamma_1$ [mPa · s, 20° C.]: | 66 |
| PGIGI-3-F | 4.00% | $V_{10}$ [V]: | 2.07 |
| CCP-V-1 | 5.00% | | |
| PGP-2-3 | 5.00% | | |
| PGP-2-4 | 5.00% | | |
| PP-1-2V1 | 6.00% | | |
| CC-3-V | 33.00% | | |
| CPGU-3-F | 4.00% | | |

The mixture has lower viscosity, a higher clearing point and a lower threshold voltage than the mixture from Comparative Example 2 with virtually the same birefringence.

EXAMPLE 4

| | | | |
|---|---|---|---|
| GGP-3-Cl | 10.00% | Clearing point [° C.]: | 76.0 |
| GGP-5-Cl | 4.00% | Δn [589 nm, 20° C.]: | 0.1300 |
| BCH-3F.F.F | 17.00% | Δε [1 kHz, 20° C.]: | 13.3 |
| BCH-5F.F.F | 10.00% | $\gamma_1$ [mPa · s, 20° C.]: | 178 |
| CCQU-2-F | 10.00% | LTS bulk −20° C.: | >1000 h |
| CCQU-3-F | 10.00% | LTS bulk −30° C.: | >1000 h |
| CCQU-5-F | 9.00% | LTS cells −20° C.: | >1000 h |
| CGU-3-F | 10.00% | LTS cells −30° C.: | >1000 h |
| CGU-5-F | 4.00% | $V_{10,0,20,90}$ [V]: | 1.06 |
| CP-3-Cl | 4.00% | | |
| CPGU-3-OT | 8.00% | | |
| CC-3-V | 4.00% | | |

EXAMPLE 5

| | | | |
|---|---|---|---|
| GGP-3-Cl | 6.00% | Clearing point [° C.]: | 77.0 |
| BCH-3F.F.F | 15.00% | Δn [589 nm, 20° C.]: | 0.1309 |
| BCH-5F.F.F | 10.00% | Δε [1 kHz, 20° C.]: | 13.7 |
| CCQU-2-F | 10.00% | $\gamma_1$ [mPa · s, 20° C.]: | 147 |
| CCQU-3-F | 10.00% | LTS bulk −20° C.: | >1000 h |
| CCQU-5-F | 3.00% | LTS bulk −30° C.: | >1000 h |
| CGU-3-F | 8.00% | LTS cells −20° C.: | >1000 h |
| CCGU-3-F | 2.00% | LTS cells −30° C.: | >1000 h |
| PUQU-3-F | 10.00% | HR (5 min./100° C.): | 95.5 |
| CPGU-3-OT | 8.00% | $V_{10,0,20,90}$ [V]: | 1.05 |
| CC-3-V | 7.00% | | |
| PP-1-2V1 | 4.00% | | |
| CCP-V-1 | 4.00% | | |
| PGP-2-4 | 3.00% | | |

EXAMPLE 6

| | | | |
|---|---|---|---|
| GGP-3-Cl | 2.00% | Clearing point [° C.]: | 75.5 |
| BCH-3F.F.F | 15.00% | Δn [589 nm, 20° C.]: | 0.1296 |
| BCH-5F.F.F | 10.00% | Δε [1 kHz, 20° C.]: | 13.6 |
| CCQU-2-F | 10.00% | $\gamma_1$ [mPa · s, 20° C.]: | 138 |
| CCQU-3-F | 11.00% | LTS bulk −20° C.: | >1000 h |
| CGU-3-F | 8.00% | LTS bulk −30° C.: | >1000 h |
| PUQU-3-F | 10.00% | LTS cells −20° C.: | >1000 h |
| CPGU-3-OT | 8.00% | LTS cells −30° C.: | >1000 h |
| CPGU-4-OT | 6.00% | $V_{10,0,20,90}$ [V]: | 1.06 |
| CC-3-V | 9.00% | | |
| PP-1-2V1 | 6.50% | | |
| CCP-V-1 | 2.50% | | |
| PGP-2-4 | 2.00% | | |

EXAMPLE 7

| | | | |
|---|---|---|---|
| GGP-3-Cl | 2.00% | Clearing point [° C.]: | 75.5 |
| BCH-3F.F.F | 15.00% | $\Delta n$ [589 nm, 20° C.]: | 0.1296 |
| BCH-5F.F.F | 10.00% | $\Delta \epsilon$ [1 kHz, 20° C.]: | 13.7 |
| CCQU-2-F | 10.00% | $\gamma_1$ [mPa · s, 20° C.]: | 139 |
| CCQU-3-F | 11.00% | LTS bulk −20° C.: | >1000 h |
| CGU-3-F | 8.00% | LTS bulk −30° C.: | >1000 h |
| PUQU-3-F | 10.00% | LTS cells −20° C.: | >1000 h |
| CPGU-2-OT | 6.00% | LTS cells −30° C.: | >1000 h |
| CPGU-3-OT | 8.00% | $V_{10,0,20,90}$ [V]: | 1.05 |
| CC-3-V | 9.00% | | |
| PP-1-2V1 | 5.50% | | |
| CCP-V-1 | 3.00% | | |
| PGP-2-4 | 2.50% | | |

EXAMPLE 8

| | | | |
|---|---|---|---|
| GGP-3-Cl | 2.00% | Clearing point [° C.]: | 75.5 |
| BCH3F.F.F | 20.00% | $\Delta n$ [589 nm, 20° C.]: | 0.1298 |
| BCH-5F.F.F | 12.00% | $\Delta \epsilon$ [1 kHz, 20° C.]: | 14.0 |
| CCQU-2-F | 9.00% | $\gamma_1$ [mPa · s, 20° C.]: | 133 |
| CCQU-3-F | 9.00% | LTS cells −20° C.: | >1000 h |
| CPGU-3-OT | 8.00% | LTS cells −30° C.: | >1000 h |
| CCGU-3-F | 1.00% | $V_{10,0,20,90}$ [V]: | 1.06 |
| CP-3-Cl | 4.00% | | |
| APUQU-2-F | 15.00% | | |
| PP-1-2V1 | 7.00% | | |
| PGP-2-4 | 3.00% | | |
| CC-3-V | 10.00% | | |

EXAMPLE 9

| | | | |
|---|---|---|---|
| GGP-3-Cl | 10.00% | Clearing point [° C.]: | 80.0 |
| CCGU-3-F | 6.00% | $\Delta n$ [589 nm, 20° C.]: | 0.1329 |
| CCP-V-1 | 5.00% | $\Delta \epsilon$ [1 kHz, 20° C.]: | 11.1 |
| CC-3-V | 26.50% | $\gamma_1$ [mPa · s, 20° C.]: | 97 |
| CCQU-2-F | 5.00% | LTS bulk −20° C.: | >1000 h |
| CCQU-3-F | 9.00% | LTS bulk −30° C.: | >1000 h |
| PUQU-3-F | 20.00% | LTS cells −20° C.: | >1000 h |
| PGP-2-3 | 4.00% | LTS cells −30° C.: | >1000 h |
| PGP-2-4 | 5.00% | $V_{10,0,20,90}$ [V]: | 1.28 |
| PP-1-2V1 | 1.50% | | |
| CPGU-3-OT | 8.00% | | |

EXAMPLE 10

| | | | |
|---|---|---|---|
| GGP-3-Cl | 8.00% | Clearing point [° C.]: | 79.5 |
| CCGU-3-F | 2.00% | $\Delta n$ [589 nm, 20° C.]: | 0.1323 |
| CCP-V-1 | 5.00% | $\Delta \epsilon$ [1 kHz, 20° C.]: | 11.1 |
| CC-3-V | 28.50% | $\gamma_1$ [mPa · s, 20° C.]: | 94 |
| CCQU-2-F | 5.00% | LTS bulk −20° C.: | >1000 h |
| CCQU-3-F | 7.00% | LTS bulk −30° C.: | >1000 h |
| PUQU-3-F | 20.00% | LTS cells −20° C.: | >1000 h |
| PGP-2-3 | 3.00% | LTS cells −30° C.: | >1000 h |
| PGP-2-4 | 5.00% | $V_{10,0,20,90}$ [V]: | 1.29 |
| PP-1-2V1 | 2.50% | | |
| CPGU-3-OT | 8.00% | | |
| CPGU-4-OT | 6.00% | | |

EXAMPLE 11

| | | | |
|---|---|---|---|
| GGP-3-Cl | 8.00% | Clearing point [° C.]: | 79.5 |
| CCGU-3-F | 2.00% | $\Delta n$ [589 nm, 20° C.]: | 0.1327 |
| CCP-V-1 | 5.00% | $\Delta \epsilon$ [1 kHz, 20° C.]: | 11.1 |
| CC-3-V | 28.00% | $\gamma_1$ [mPa · s, 20° C.]: | 92 |
| CCQU-2-F | 5.00% | LTS bulk −20° C.: | >1000 h |
| CCQU-3-F | 7.00% | LTS bulk −30° C.: | >1000 h |
| PUQU-3-F | 20.00% | LTS cells −20° C.: | >1000 h |
| PGP-2-4 | 5.00% | $V_{10,0,20,90}$ [V]: | 1.29 |
| PGP-2-5 | 3.00% | | |
| PP-1-2V1 | 3.00% | | |
| CPGU-3-OT | 8.00% | | |
| CPGU-4-OT | 6.00% | | |

EXAMPLE 12

| | | | |
|---|---|---|---|
| GGP-3-Cl | 8.00% | Clearing point [° C.]: | 78.5 |
| CCGU-3-F | 2.00% | $\Delta n$ [589 nm, 20° C.]: | 0.1326 |
| CCP-V-1 | 5.00% | $\Delta \epsilon$ [1 kHz, 20° C.]: | 11.2 |
| CC-3-V | 28.50% | $\gamma_1$ [mPa · s, 20° C.]: | 89 |
| CCQU-2-F | 5.00% | LTS bulk −20° C.: | >1000 h |
| CCQU-3-F | 7.00% | $V_{10,0,20,90}$ [V]: | 1.28 |
| PUQU-3-F | 20.00% | | |
| PGP-2-3 | 3.00% | | |
| PGP-2-4 | 5.00% | | |
| PP-1-2V1 | 2.50% | | |
| CPGU-2-OT | 6.00% | | |
| CPGU-3-OT | 8.00% | | |

EXAMPLE 13

| | | | |
|---|---|---|---|
| GGP-3-Cl | 3.00% | Clearing point [° C.]: | 76 |
| CC-3-V | 33.00% | $\Delta n$ [589 nm, 20° C.]: | 0.1319 |
| CCP-V-1 | 14.00% | $\Delta \epsilon$ [1 kHz, 20° C.]: | 6.4 |
| BCH-3F.F.F | 5.00% | $\gamma_1$ [mPa · s, 20° C.]: | 67 |
| PUQU-3-F | 16.00% | LTS bulk −20° C.: | >1000 h |
| PGP-2-3 | 3.00% | LTS cells −20° C.: | >1000 h |
| PGP-2-4 | 5.00% | LTS cells −30° C.: | >1000 h |
| PGP-2-5 | 7.00% | $V_{10,0,20,90}$ [V]: | 1.73 |
| PP-1-2V1 | 6.00% | | |
| CPGU-3-OT | 8.00% | | |

EXAMPLE 14

| | | | |
|---|---|---|---|
| GGP-3-Cl | 3.00% | Clearing point [° C.]: | 75 |
| CC-3-V | 37.00% | $\Delta n$ [589 nm, 20° C.]: | 0.1309 |
| CCP-V-1 | 11.00% | $\Delta \epsilon$ [1 kHz, 20° C.]: | 6.1 |
| PUQU-3-F | 14.00% | $\gamma_1$ [mPa · s, 20° C.]: | 64 |
| PGP-2-4 | 5.00% | LTS bulk −20° C.: | >1000 h |
| PGP-2-5 | 7.00% | LTS cells −20° C.: | >1000 h |
| PP-1-2V1 | 10.00% | $V_{10,0,20,90}$ [V]: | 1.76 |
| CPGU-2-OT | 5.00% | | |
| CPGU-3-OT | 8.00% | | |

EXAMPLE 15

| | | | |
|---|---|---|---|
| GGP-3-Cl | 3.00% | Clearing point [° C.]: | 75 |
| CC-3-V | 37.00% | Δn [589 nm, 20° C.]: | 0.1310 |
| CCP-V-1 | 10.50% | Δε [1 kHz, 20° C.]: | 6.2 |
| PUQU-3-F | 14.50% | $\gamma_1$ [mPa · s, 20° C.]: | 65 |
| PGP-2-4 | 5.00% | LTS bulk −20° C.: | >1000 h |
| PGP-2-5 | 7.00% | LTS cells −20° C.: | >1000 h |
| PP-1-2V1 | 10.00% | $V_{10,0,20,90}$ [V]: | 1.73 |
| CPGU-3-OT | 13.00% | | |

EXAMPLE 16

| | | | |
|---|---|---|---|
| GGP-3-Cl | 3.00% | Clearing point [° C.]: | 76.5 |
| CC-3-V | 38.50% | Δn [589 nm, 20° C.]: | 0.1171 |
| CCP-V-1 | 16.00% | Δε [1 kHz, 20° C.]: | 5.7 |
| BCH-3F.F.F | 11.00% | $\gamma_1$ [mPa · s, 20° C.]: | 62 |
| PUQU-3-F | 11.00% | LTS bulk −20° C.: | >1000 h |
| PGP-2-4 | 5.00% | LTS bulk −30° C.: | >1000 h |
| PGP-2-5 | 3.00% | LTS cells −20° C.: | >1000 h |
| PR-1-2V1 | 4.50% | LTS cells −30° C.: | >1000 h |
| CPGU-3-OT | 8.00% | $V_{10,0,20,90}$ [V]: | 1.75 |

EXAMPLE 17

| | | | |
|---|---|---|---|
| GGP-3-Cl | 2.00% | Clearing point [° C.]: | 75.5 |
| CC-3-V | 45.00% | Δn [589 nm, 20° C.]: | 0.1161 |
| CCP-V-1 | 11.00% | Δε [1 kHz, 20° C.]: | 5.6 |
| PUQU-3-F | 7.00% | $\gamma_1$ [mPa · s, 20° C.]: | 59 |
| PGP-2-4 | 5.00% | LTS bulk −20° C.: | >1000 h |
| PGP-2-5 | 5.00% | LTS cells −20° C.: | >1000 h |
| PP-1-2V1 | 8.00% | LTS cells −30° C.: | >1000 h |
| APUQU-3-F | 10.00% | $V_{10,0,20,90}$ [V]: | 1.82 |
| CPGU-3-OT | 7.00% | | |

EXAMPLE 18

| | | | |
|---|---|---|---|
| GGP-3-Cl | 3.00% | Clearing point [° C.]: | 76.0 |
| CC-3-V | 45.00% | Δn [589 nm, 20° C.]: | 0.1166 |
| CCP-V-1 | 10.50% | Δε [1 kHz, 20° C.]: | 6.0 |
| PUQU-3-F | 7.50% | $\gamma_1$ [mPa · s, 20° C.]: | 59 |
| PGP-2-4 | 5.00% | LTS bulk −20° C.: | >1000 h |
| PGP-2-5 | 4.00% | LTS bulk −30° C.: | >1000 h |
| PP-1-2V1 | 7.00% | LTS cells −20° C.: | >1000 h |
| APUQU-3-F | 10.00% | LTS cells −30° C.: | >1000 h |
| CPGU-3-OT | 8.00% | $V_{10,0,20,90}$ [V]: | 1.73 |

EXAMPLE 19

| | | | |
|---|---|---|---|
| CC-3-V | 45.00% | Clearing point [° C.]: | 76.5 |
| CCP-V-1 | 9.00% | Δn [589 nm, 20° C.]: | 0.1174 |
| PUQU-3-F | 7.50% | Δε [1 kHz, 20° C.]: | 6.1 |
| PGP-2-4 | 6.00% | $\gamma_1$ [mPa · s, 20° C.]: | 60 |
| PGP-2-5 | 6.50% | LTS bulk −20° C.: | >1000 h |
| PP-1-2V1 | 7.00% | LTS cells −20° C.: | >1000 h |
| APUQU-3-F | 11.00% | LTS cells −30° C.: | >1000 h |
| CPGU-3-OT | 8.00% | $V_{10,0,20,90}$ [V]: | 1.76 |

EXAMPLE 20

| | | | |
|---|---|---|---|
| CC-3-V | 45.00% | Clearing point [° C.]: | 76.5 |
| CCP-V-1 | 9.00% | Δn [589 nm, 20° C.]: | 0.1172 |
| PUQU-3-F | 7.50% | Δε [1 kHz, 20° C.]: | 6.1 |
| PGP-2-5 | 12.00% | $\gamma_1$ [mPa · s, 20° C.]: | 60 |
| PP-1-2V1 | 7.50% | LTS bulk −20° C.: | >1000 h |
| APUQU-3-F | 11.00% | LTS cells −20° C.: | >1000 h |
| CPGU-3-OT | 8.00% | $V_{10,0,20,90}$ [V]: | 1.78 |

EXAMPLE 21

| | | | |
|---|---|---|---|
| GGP-3-Cl | 7.00% | Clearing point [° C.]: | 75.2 |
| GGP-5-Cl | 3.00% | Δn [589 nm, 20° C.]: | 0.1262 |
| PGU-2-F | 5.00% | Δε [1 kHz, 20° C.]: | 4.5 |
| PGU-3-F | 5.00% | $\gamma_1$ [mPa · s, 20° C.]: | 62 |
| PUQU-2-F | 4.00% | $V_{10,0,20,90}$ [V]: | 1.95 |
| PUQU-3-F | 3.00% | | |
| CCP-V-1 | 12.00% | | |
| CCP-V2-1 | 6.00% | | |
| CC-3-V1 | 8.00% | | |
| PGP-2-3 | 6.00% | | |
| PGP-2-4 | 6.00% | | |
| CC-3-V | 32.00% | | |
| CP-3-Cl | 3.00% | | |

EXAMPLE 22

| | | | |
|---|---|---|---|
| CPGU-2-OT | 2.50% | Clearing point [° C.]: | 77.0 |
| CPGU-3-OT | 3.00% | Δn [589 nm, 20° C.]: | 0.1266 |
| PGU-2-F | 5.00% | Δε [1 kHz, 20° C.]: | 4.7 |
| PGU-3-F | 5.00% | $\gamma_1$ [mPa · s, 20° C.]: | 58 |
| PUQU-2-F | 4.00% | LTS bulk −20° C.: | >1000 h |
| PUQU-3-F | 3.00% | LTS cells −20° C.: | >1000 h |
| CCP-V-1 | 13.00% | LTS cells −30° C.: | >1000 h |
| CC-3-V1 | 7.00% | $V_{10,0,20,90}$ [V]: | 1.90 |
| PGP-2-3 | 6.00% | | |
| PGP-2-4 | 6.50% | | |
| PGP-2-5 | 7.00% | | |
| CC-3-V | 35.00% | | |
| PCH-3Cl | 3.00% | | |

EXAMPLE 23

| | | | |
|---|---|---|---|
| CPGU-2-OT | 2.00% | Clearing point [° C.]: | 74.0 |
| CPGU-3-OT | 3.00% | Δn [589 nm, 20° C.]: | 0.1260 |
| PGU-2-F | 5.00% | Δε [1 kHz, 20° C.]: | 4.6 |
| PGU-3-F | 5.00% | $\gamma_1$ [mPa · s, 20° C.]: | 57 |
| PUQU-2-F | 4.00% | LTS bulk −20° C.: | >1000 h |
| PUQU-3-F | 3.00% | LTS cells −20° C.: | >1000 h |
| CCP-V-1 | 13.00% | LTS cells −30° C.: | >1000 h |
| CC-3-V1 | 7.00% | $V_{10,0,20,90}$ [V]: | 1.92 |
| PGP-2-3 | 6.00% | | |

-continued

| | |
|---|---|
| PGP-2-4 | 6.00% |
| PGP-2-5 | 7.00% |
| CC-3-V | 36.00% |
| GP-2-Cl | 3.00% |

EXAMPLE 24

| | | | |
|---|---|---|---|
| CPGU-2-OT | 2.00% | Clearing point [° C.]: | 74.5 |
| CPGU-3-OT | 3.00% | $\Delta n$ [589 nm, 20° C.]: | 0.1268 |
| PGU-2-F | 5.00% | $\Delta \epsilon$ [1 kHz, 20° C.]: | 4.6 |
| PGU-3-F | 5.00% | $\gamma_1$ [mPa·s, 20° C.]: | 58 |
| PUQU-3-F | 6.00% | LTS bulk −20° C.: | >1000 h |
| CCP-V-1 | 16.00% | LTS cells −20° C.: | >1000 h |
| CC-3-V1 | 5.00% | LTS cells −30° C.: | >1000 h |
| PGP-2-3 | 6.00% | $V_{10,0,20,90}$ [V]: | 1.93 |
| PGP-2-4 | 6.00% | | |
| PGP-2-5 | 6.00% | | |
| CC-3-V | 35.00% | | |
| GP-2-Cl | 5.00% | | |

EXAMPLE 25

| | | | |
|---|---|---|---|
| CPGU-2-F | 3.00% | Clearing point [° C.]: | 74.5 |
| CPGU-3-F | 3.00% | $\Delta n$ [589 nm, 20° C.]: | 0.1258 |
| PGU-2-F | 5.00% | $\Delta \epsilon$ [1 kHz, 20° C.]: | 4.7 |
| PGU-3-F | 5.00% | $\gamma_1$ [mPa·s, 20° C.]: | 57 |
| PUQU-2-F | 4.00% | LTS bulk −20° C.: | >1000 h |
| PUQU-3-F | 3.00% | LTS cells −20° C.: | >1000 h |
| CCP-V-1 | 14.00% | LTS cells −30° C.: | >1000 h |
| CC-3-V1 | 6.00% | $V_{10,0,20,90}$ [V]: | 1.92 |
| PGP-2-3 | 5.00% | | |
| PGP-2-4 | 5.00% | | |
| PGP-2-5 | 6.00% | | |
| CC-3-V | 35.00% | | |
| PCH-3Cl | 3.00% | | |
| PP-1-2V1 | 3.00% | | |

EXAMPLE 26

| | | | |
|---|---|---|---|
| CPGU-2-F | 3.00% | Clearing point [° C.]: | 74.0 |
| CPGU-3-F | 3.00% | $\Delta n$ [589 nm, 20° C.]: | 0.1263 |
| PGU-2-F | 5.00% | $\Delta \epsilon$ [1 kHz, 20° C.]: | 4.6 |
| PGU-3-F | 5.00% | $\gamma_1$ [mPa·s, 20° C.]: | 57 |
| PUQU-3-F | 6.00% | LTS bulk −20° C.: | >1000 h |
| CCP-V-1 | 15.00% | LTS bulk −30° C.: | >1000 h |
| CC-3-V1 | 6.00% | LTS cells −20° C.: | >1000 h |
| PGP-2-3 | 5.00% | LTS cells −30° C.: | >1000 h |
| PGP-2-4 | 6.00% | $V_{10,0,20,90}$ [V]: | 1.90 |
| PGP-2-5 | 6.00% | | |
| CC-3-V | 35.00% | | |
| GP-2-Cl | 5.00% | | |

EXAMPLE 27

| | | | |
|---|---|---|---|
| CPGU-2-OT | 2.00% | Clearing point [° C.]: | 76.0 |
| CPGU-3-OT | 3.00% | $\Delta n$ [589 nm, 20° C.]: | 0.1245 |
| CC-3-V | 32.00% | $\Delta \epsilon$ [1 kHz, 20° C.]: | 4.3 |
| CC-3-V1 | 6.00% | $\gamma_1$ [mPa·s, 20° C.]: | 60 |
| CCP-V-1 | 18.00% | LTS bulk −20° C.: | >1000 h |
| PGP-2-3 | 6.00% | LTS bulk −30° C.: | >1000 h |
| PGP-2-4 | 6.00% | LTS cells −20° C.: | >1000 h |
| PGP-2-5 | 7.00% | LTS cells −30° C.: | >1000 h |
| PP-1-2V1 | 4.00% | $V_{10,0,20,90}$ [V]: | 2.07 |
| PUQU-3-F | 14.00% | | |
| GP-2-Cl | 2.00% | | |

EXAMPLE 28

| | | | |
|---|---|---|---|
| CPGU-3-F | 10.00% | Clearing point [° C.]: | 79.0 |
| CC-3-V | 33.00% | $\Delta n$ [589 nm, 20° C.]: | 0.1244 |
| CC-3-V1 | 6.00% | $\Delta \epsilon$ [1 kHz, 20° C.]: | 4.3 |
| CCP-V-1 | 17.00% | $\gamma_1$ [mPa·s, 20° C.]: | 61 |
| PGP-2-4 | 7.00% | LTS bulk −20° C.: | >1000 h |
| PGP-2-5 | 6.00% | LTS cells −20° C.: | >1000 h |
| PP-1-2V1 | 8.00% | LTS cells −30° C.: | >1000 h |
| PUQU-3-F | 11.00% | $V_{10,0,20,90}$ [V]: | 2.11 |
| GP-2-Cl | 2.00% | | |

EXAMPLE 29

| | | | |
|---|---|---|---|
| GGP-3-Cl | 4.00% | Clearing point [° C.]: | 75.0 |
| GGP-5-Cl | 4.00% | $\Delta n$ [589 nm, 20° C.]: | 0.1420 |
| CGU-3-F | 4.00% | $\Delta \epsilon$ [1 kHz, 20° C.]: | 4.2 |
| BCH-3F.F.F | 12.00% | $\gamma_1$ [mPa·s, 20° C.]: | 64 |
| PGP-2-3 | 5.00% | LTS bulk −20° C.: | >1000 h |
| PGP-2-4 | 8.00% | LTS cells −20° C.: | >1000 h |
| PGP-2-5 | 8.00% | LTS cells −30° C.: | >1000 h |
| PP-1-2V1 | 9.00% | $V_{10,0,20,90}$ [V]: | 2.11 |
| CC-3-V | 39.00% | | |
| CPGU-3-OT | 7.00% | | |

EXAMPLE 30

| | | | |
|---|---|---|---|
| GGP-3-Cl | 9.00% | Clearing point [° C.]: | 73.5 |
| PUQU-3-F | 7.00% | $\Delta n$ [589 nm, 20° C.]: | 0.1433 |
| CPGU-3-OT | 11.00% | $\Delta \epsilon$ [1 kHz, 20° C.]: | 4.5 |
| PGP-2-3 | 6.00% | $\gamma_1$ [mPa·s, 20° C.]: | 62 |
| PGP-2-4 | 6.00% | LTS bulk −20° C.: | >1000 h |
| PGP-2-5 | 8.00% | LTS cells −20° C.: | >1000 h |
| CC-3-V | 43.00% | LTS cells −30° C.: | >1000 h |
| PP-1-2V1 | 10.00% | $V_{10,0,20,90}$ [V]: | 2.03 |

EXAMPLE 31

| | | | |
|---|---|---|---|
| GGP-3-Cl | 10.00% | Clearing point [° C.]: | 74.0 |
| PUQU-3-F | 10.00% | $\Delta n$ [589 nm, 20° C.]: | 0.1430 |
| CPGU-3-OT | 6.00% | $\Delta \epsilon$ [1 kHz, 20° C.]: | 4.4 |
| CCP-V-1 | 6.00% | $\gamma_1$ [mPa·s, 20° C.]: | 65 |
| PGP-2-3 | 6.00% | LTS bulk −20° C.: | >1000 h |
| PGP-2-4 | 6.00% | LTS bulk −30° C.: | >1000 h |

-continued

| | | | |
|---|---|---|---|
| PGP-2-5 | 10.00% | LTS cells −20° C.: | >1000 h |
| CC-3-V | 39.00% | LTS cells −30° C.: | >1000 h |
| PP-1-2V1 | 7.00% | $V_{10,0,20,90}$ [V]: | 2.01 |

EXAMPLE 32

| | | | |
|---|---|---|---|
| CCQU-2-F | 10.00% | Clearing point [° C.]: | 79.5 |
| CCQU-3-F | 10.00% | Δn [589 nm, 20° C.]: | 0.0977 |
| CCQU-5-F | 10.00% | Δε [1 kHz, 20° C.]: | 14.6 |
| PUQU-2-F | 8.00% | $γ_1$ [mPa · s, 20° C.]: | 129 |
| PUQU-3-F | 8.00% | LTS bulk −20° C.: | >1000 h |
| CCP-2F.F.F | 3.00% | LTS cells −20° C.: | >1000 h |
| CCP-3F.F.F | 11.00% | LTS cells −30° C.: | >1000 h |
| CGU-3-F | 9.00% | $V_{10,0,20,90}$ [V]: | 1.08 |
| CCGU-3-F | 8.00% | | |
| CC-3-V | 15.00% | | |
| CCP-V-1 | 2.00% | | |
| CPGU-3-OT | 6.00% | | |

EXAMPLE 33

| | | | |
|---|---|---|---|
| CCQU-2-F | 10.00% | Clearing point [° C.]: | 79.5 |
| CCQU-3-F | 11.00% | Δn [589 nm, 20° C.]: | 0.0969 |
| CCQU-5-F | 10.00% | Δε [1 kHz, 20° C.]: | 14.6 |
| PUQU-2-F | 10.00% | $γ_1$ [mPa · s, 20° C.]: | 121 |
| PUQU-3-F | 8.00% | LTS bulk −20° C.: | >1000 h |
| CCP-2F.F.F | 3.00% | LTS cells −20° C.: | >1000 h |
| CCP-3F.F.F | 8.00% | LTS cells −30° C.: | >1000 h |
| CGU-3-F | 6.00% | $V_{10,0,20,90}$ [V]: | 1.09 |
| CCGU-3-F | 9.00% | | |
| CC-3-V | 15.00% | | |
| CC-3-V1 | 4.00% | | |
| CPGU-3-OT | 6.00% | | |

The invention claimed is:

1. A liquid-crystalline medium having a positive dielectric anisotropy, comprising one or more compounds of formula I, and one or more compounds of formula III, and/or one or more of the compounds of formula XIIa, XIIb and/or XIIc

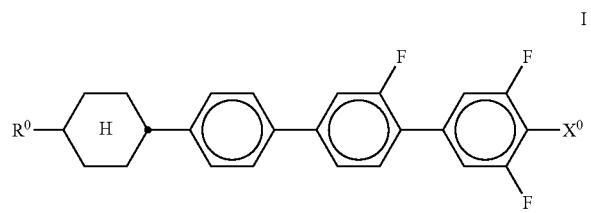

in which $R^0$ denotes an alkyl or alkoxy radical having 1 to 15 C atoms, in which one or more $CH_2$ groups are optionally, independently of one another, replaced by —C≡C—, —$CF_2$O—, —CH═CH—,

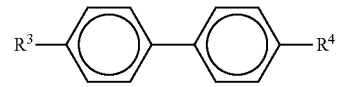

—O—, —CO—O— or —O—CO— in such a way that O atoms are not linked directly to one another, and in which one or more H atoms may be replaced by halogen atoms, and $X^0$ denotes F, Cl, CN, $SF_5$, SCN, NCS, a halogenated alkyl radical, a halogenated alkenyl radical, or a halogenated alkoxy radical having up to 6 C atoms,

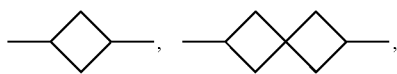

in which $R^3$ denotes alkenyl having 2 to 9 C atoms, and $R^4$ denotes an alkyl or alkoxy radical having 1 to 15 C atoms, in which one or more $CH_2$ groups are optionally, independently of one another, replaced by —C≡C—, —$CF_2$O—, —CH═CH—,

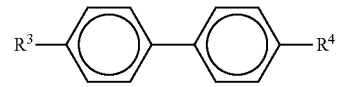

—O—, —CO—O— or —O—CO— in such a way that O atoms are not linked directly to one another, and in which one or more H atoms may be replaced by halogen atoms,

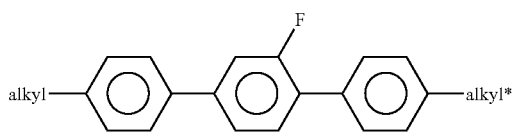

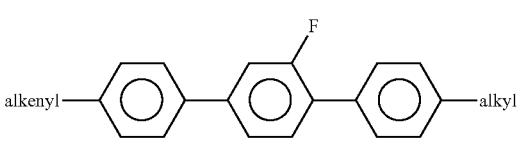

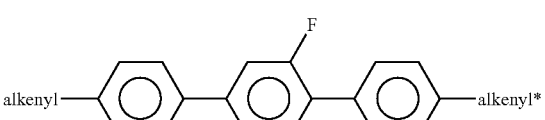

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

2. A liquid-crystalline medium according to claim 1, further comprising a compound of formula II

in which

A denotes 1,4-phenylene or trans-1,4-cyclohexylene, a denotes 0 or 1, $R^3$ denotes alkenyl having 2 to 9 C atoms, and $R^4$ denotes an alkyl or alkoxy radical having 1 to 15 C atoms, in which one or more $CH_2$ groups are optionally, independently of one another, replaced by —C≡C—, —$CF_2$O—, —CH=CH—,

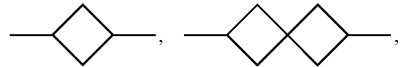

—O—, —CO—O— or —O—CO— in such a way that O atoms are not linked directly to one another, and in which one or more H atoms may be replaced by halogen atoms.

3. A liquid-crystalline medium according to claim 1, comprising a compound of the following formulae:

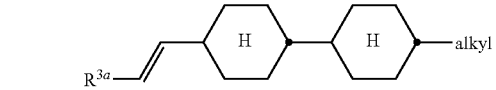

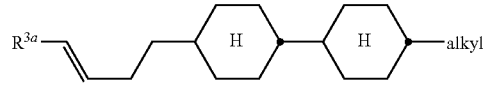

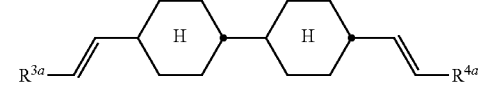

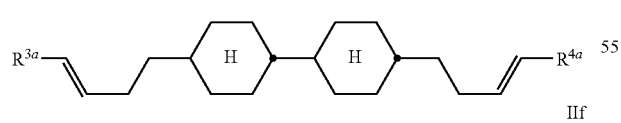

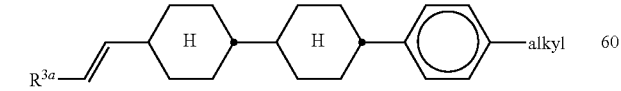

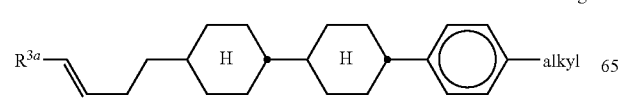

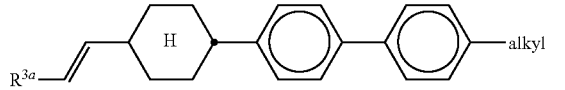

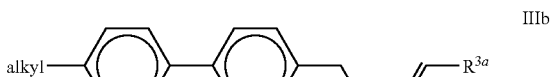

in which $R^{3a}$ and $R^{4a}$ each, independently of one another, denote H, $CH_3$, $C_2H_5$ or $C_3H_7$, and alkyl denotes a straight-chain alkyl group having 1 to 8 C atoms.

4. A liquid-crystalline medium according to claim 1, further comprising a compound of the following formulae:

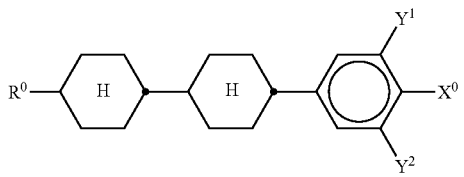

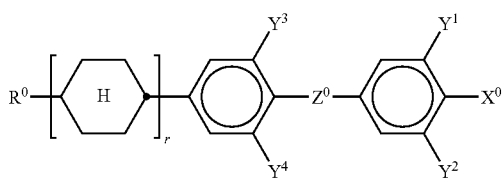

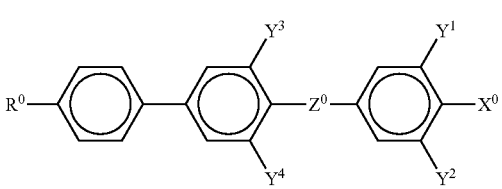

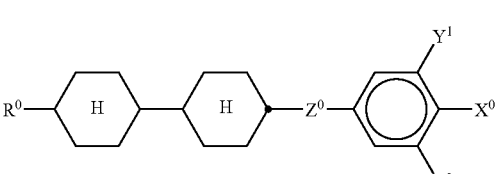

-continued

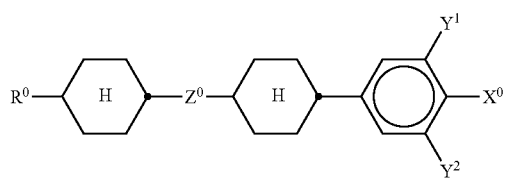
VIII in which

R⁰ denotes an alkyl or alkoxy radical having 1 to 15 C atoms, in which one or more CH₂ groups are optionally, independently of one another, replaced by —C≡C—, —CF₂O—, —CH=CH—,

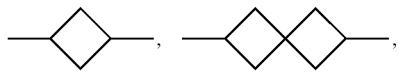

—O—, —CO—O— or —O—CO— in such a way that O atoms are not linked directly to one another, and in which one or more H atoms may be replaced by halogen atoms, and X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms, Y$^{1-4}$ each, independently of one another, denote H or F, Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO—, —CF₂O— or —OCF₂—, and in formulae V and VI also a single bond, and r denotes 0 or 1.

5. A liquid-crystalline medium according to claim 1, comprising a compound of the following formulae:

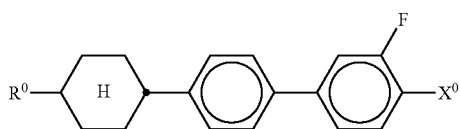
Va

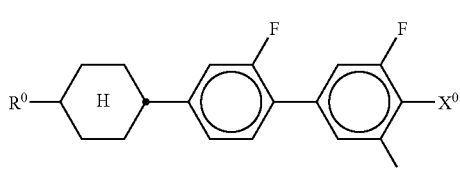
Vb

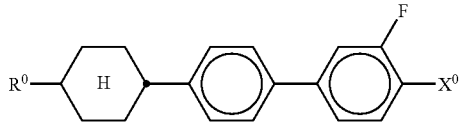
Vc

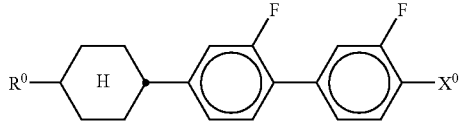
Vd

-continued

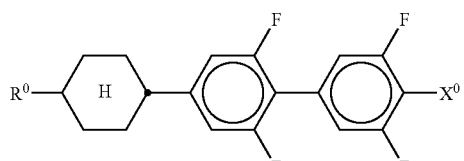
Ve

Vf

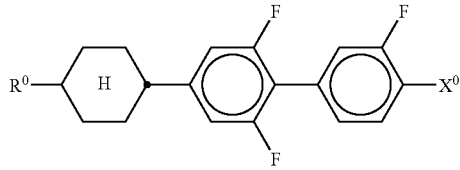
Vg in which

R⁰ denotes an alkyl or alkoxy radical having 1 to 15 C atoms, in which one or more CH₂ groups are optionally, independently of one another, replaced by —C≡C—, —CF₂O—, —CH=CH—,

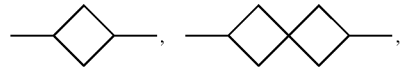

—O—, —CO—O— or —O—CO— in such a way that 0 atoms are not linked directly to one another, and in which one or more H atoms may be replaced by halogen atoms, and X⁰ denotes F, Cl, CN, SF₅, SCN, NCS, a halogenated alkyl radical, a halogenated alkenyl radical, a halogenated alkoxy radical or a halogenated alkenyloxy radical having up to 6 C atoms.

6. A liquid-crystalline medium according to claim 1, comprising a compound of the following formulae:

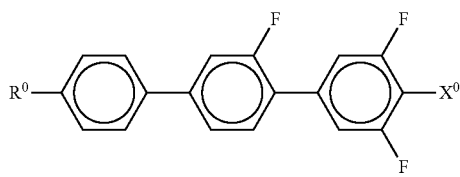
VI-1a

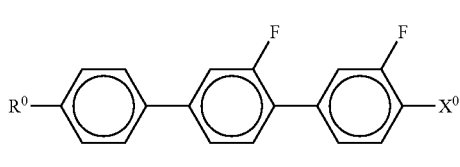
VI-1b

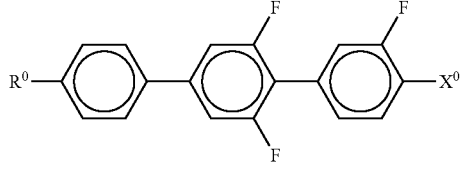
VI-1c

-continued

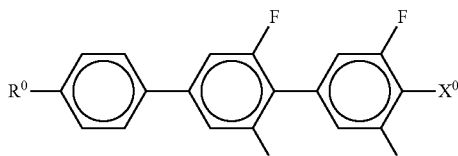
VI-1d in which
R⁰ denotes an alkyl or alkoxy radical having 1 to 15 C atoms, in which one or more $CH_2$ groups are optionally, independently of one another, replaced by —C≡C—, —$CF_2$O—, —CH=CH—,

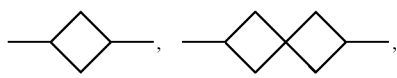

—O—, —CO—O— or —O—CO— in such a way that 0 atoms are not linked directly to one another, and in which one or more H atoms may be replaced by halogen atoms, and X⁰ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms.

7. A liquid-crystalline medium according to claim 1, further comprising a compound of the following formulae:

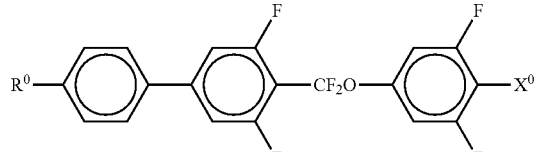
VI-2a

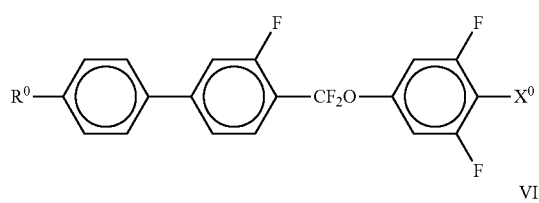
VI-2b

VI-2c
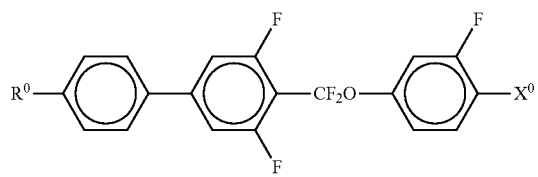

VI-2d
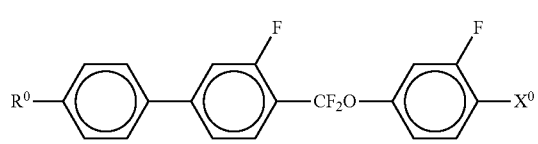

in which
R⁰ denotes an alkyl or alkoxy radical having 1 to 15 C atoms, in which one or more $CH_2$ groups are optionally, independently of one another, replaced by —C≡C—, —$CF_2$O—, —CH=CH—,

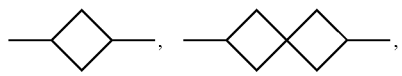

—O—, —CO—O— or —O—CO— in such a way that 0 atoms are not linked directly to one another, and in which one or more H atoms may be replaced by halogen atoms, and X⁰ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms.

8. A liquid-crystalline medium according to claim 1, further comprising a compound of the following formulae:

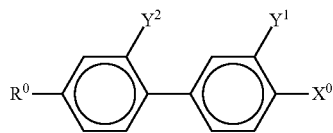
XIII

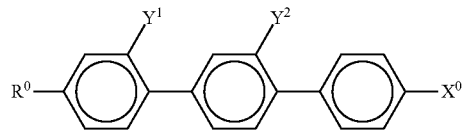
XIV

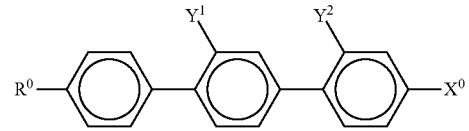
XV

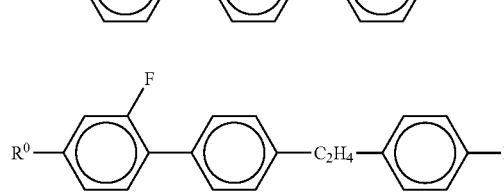
XVI in which
$Y^1$ and $Y^2$ are each, independently, H or F.

9. A liquid-crystalline medium according to claim 2, comprising 1-25% by weight of one or more compounds of formula I,
25-80% by weight of one or more compounds of formulae III and optionally II,
5-40% by weight of one or more compounds of formula XIIa, XIIb and/or XIIc.

10. A liquid-crystalline medium according to claim 1, further comprising one or more UV stabilizers and/or antioxidants.

11. An electro-optical device containing a liquid-crystalline medium according to claim 1.

12. An electro-optical liquid-crystal display containing a liquid-crystalline medium according to claim 1.

13. A process for preparing a liquid-crystalline medium according to claim 1, comprising mixing together a compound of formula I with a compound of formula III and/or XIIa, XIIb and/or XIIc.

14. An electro-optical liquid-crystal display according to claim 12, which is a TN-TFT display.

15. A liquid-crystalline medium according to claim 1, which comprises a compound of formula III.

16. A liquid-crystalline medium according to claim 1, which comprises a compound of formula XIIa.

17. A liquid-crystalline medium according to claim 1, which comprises a compound of formula III and of formula XIIa, XIIb and/or XIIc.

18. A liquid-crystalline medium according to claim 1, which comprises a compound of formula III, and does not contain a compound of formula XIIa, XIIb and/or XIIc.

19. A liquid-crystalline medium according to claim 1, which comprises a compound of formula XIIb.

20. A liquid-crystalline medium according to claim 1, which comprises a compound of formula XIIc.

\* \* \* \* \*

UNITED STATES PATENT AND TRADEMARK OFFICE
CERTIFICATE OF CORRECTION

PATENT NO. : 8,486,298 B2  Page 1 of 1
APPLICATION NO. : 12/439187
DATED : July 16, 2013
INVENTOR(S) : Hirschmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this

Eighth Day of September, 2015

Michelle K. Lee
*Director of the United States Patent and Trademark Office*